US012792682B2

(12) United States Patent
Sheng et al.

(10) Patent No.: US 12,792,682 B2
(45) Date of Patent: Nov. 10, 2026

(54) TRANSFERABLE NEURAL ARCHITECTURE FOR STRUCTURED DATA EXTRACTION FROM WEB DOCUMENTS

(71) Applicant: Google LLC, Mountain View, CA (US)

(72) Inventors: Ying Sheng, Mountain View, CA (US); Yuchen Lin, Los Angeles, CA (US); Sandeep Tata, Mountain View, CA (US); Nguyen Vo, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/538,584

(22) Filed: Dec. 13, 2023

(65) Prior Publication Data

US 2024/0126827 A1 Apr. 18, 2024

Related U.S. Application Data

(63) Continuation of application No. 17/792,788, filed as application No. PCT/US2020/015602 on Jan. 29, 2020, now Pat. No. 11,886,533.

(51) Int. Cl.
*G06F 16/958* (2019.01)
*G06F 16/957* (2019.01)
*G06F 40/14* (2020.01)

(52) U.S. Cl.
CPC .......... *G06F 16/986* (2019.01); *G06F 16/957* (2019.01); *G06F 40/14* (2020.01)

(58) Field of Classification Search
CPC ....... G06F 16/986; G06F 16/957; G06F 40/14
(Continued)

(56) References Cited

U.S. PATENT DOCUMENTS 11,222,630 B1 * 1/2022 Soni ...................... G10L 15/187
11,295,083 B1 * 4/2022 Yun .......................... G06N 3/08
(Continued)

FOREIGN PATENT DOCUMENTS

CN 109657135 4/2019
EP 1550961 7/2005
(Continued)

OTHER PUBLICATIONS

Adam Santoro, David Raposo, David G. T. Barrett, Mateusz Malinowski, Razvan Pascanu, Peter W. Battaglia, and Timothy P. Lillicrap. A simple neural network module for relational reasoning. In NIPS, 2017.
(Continued)

*Primary Examiner* — Matthew Ell
*Assistant Examiner* — Nicholas Hasty
(74) *Attorney, Agent, or Firm* — Gray Ice Higdon

(57) ABSTRACT

Systems and methods for efficiently identifying and extracting machine-actionable structured data from web documents are provided. The technology employs neural network architectures which process the raw HTML content of a set of seed websites to create transferrable models regarding information of interest. These models can then be applied to the raw HTML of other websites to identify similar information of interest. Data can thus be extracted across multiple websites in a functional, structured form that allows it to be used further by a processing system.

20 Claims, 13 Drawing Sheets

400

(58) Field of Classification Search
USPC .......................................................... 715/234
See application file for complete search history.

(56) References Cited

U.S. PATENT DOCUMENTS

| | | | | |
|---|---|---|---|---|
| 2002/0111961 | A1 | 8/2002 | Billings et al. | |
| 2010/0257440 | A1* | 10/2010 | Kshirsagar | G06F 16/986 715/256 |
| 2012/0221545 | A1 | 8/2012 | Bell et al. | |
| 2013/0238607 | A1 | 9/2013 | Yao et al. | |
| 2014/0089865 | A1 | 3/2014 | Gay | |
| 2015/0095770 | A1 | 4/2015 | Mani | |
| 2015/0100304 | A1 | 4/2015 | Tealdi et al. | |
| 2015/0324454 | A1 | 11/2015 | Roberts | |
| 2018/0121799 | A1* | 5/2018 | Hashimoto | G06F 40/284 |
| 2020/0004792 | A1 | 1/2020 | Chang et al. | |
| 2021/0034701 | A1* | 2/2021 | Fei | G06N 3/0464 |
| 2021/0034707 | A1* | 2/2021 | Podgorny | G06F 40/216 |
| 2021/0191993 | A1 | 6/2021 | Li | |

FOREIGN PATENT DOCUMENTS

| | | | |
|---|---|---|---|
| JP | 2018112853 | A | 7/2018 |
| KR | 20180077690 | A | 7/2018 |

OTHER PUBLICATIONS

Adi Omari, Benny Kimelfeld, Eran Yahav, and Sharon Shoham. Lossless separation of web pages into layout code and data. In Proceedings of the 22nd ACM SIGKDD international conference on knowledge discovery and data mining, pp. 1805-1814, 2016.

Andreas Schulz, Jörg Lässig, and Martin Gaedke. Practical web data extraction: are we there yet?—a short survey. In 2016 IEEE/WIC/ACM International Conference on Web Intelligence (WI), pp. 562-567. IEEE, 2016.

Andrew Carlson and Charles Schafer. Bootstrapping information extraction from semi-structured web pages. In Joint European Conference on Machine Learning and Knowledge Discovery in Databases, pp. 195-210. Springer, 2008.

Anna Lisa Gentile, Ziqi Zhang, and Fabio Ciravegna. Web scale information extraction with lodie. In AAAI Fall Symposia, 2013.

Ashish Vaswani, Noam Shazeer, Niki Parmar, Jakob Uszkoreit, Llion Jones, Aidan N. Gomez, Lukasz Kaiser, and Illia Polosukhin. Attention Is All You Need. In NIPS. 2017.

Bill Y. Lin, Frank F. Xu, Zhiyi Luo, and Kenny Q. Zhu. Multi-channel BiLSTM-CRF model for emerging named entity recognition in social media. In NUT@EMNLP, 2017.

Bill Yuchen Lin and Wei Lu. Neural adaptation layers for cross-domain named entity recognition. In EMNLP, 2018.

Bill Yuchen Lin, et al. AlpacaTag: An active learning-based crowd annotation framework for sequence tagging. In Proceedings of the 57th Annual Meeting of the Association for Computational Linguistics: System Demonstrations, 2019.

Bill Yuchen Lin, et al. KagNet: Knowledge-aware graph networks for commonsense reasoning. In Proceedings of the 2019 Conf. on Empirical Methods in Natural Language Processing and the 9th International Joint Conference on Natural Language Processing, 2019.

Chia-Hui Chang, Mohammed O. Kayed, Moheb R. Girgis, and Khaled F. Shaalan. A survey of web information extraction systems. IEEE Transactions on Knowledge and Data Engineering, 18:1411-1428, 2006.

Colin Lockard, Prashant Shiralkar, Xin Dong, and Hannaneh Hajishirzi. Ze-roshotceres: Zero-shot relation extraction from semi-structured webpages. In Proceedings of ACL, 2020.

Colin Lockard, Xin Luna Dong, Prashant Shiralkar, and Arash Einolghozati. CERES: distantly supervised relation extraction from the semi-structured web. PVLDB, 11(10):1084-1096, 2018. doi: 10.14778/3231751.3231758.

Dan Olteanu, Holger Meuss, Tim Furche, and François Bry. XPath: Looking Forward. In EDBT Workshops. 2002.

Daojian Zeng, Kang Liu, Siwei Lai, Guangyou Zhou, and Jun Zhao. Relation classification via convolutional deep neural network. In COLING, 2014.

Dustin Arendt Prasha Shresha, et al. Forecasting social interactions from dynamic graphs: A case study of twitter, github, and youtube. In Proceedings of the 15th International Workshop on Mining and Learning with Graphs (MLG), 2019.

Emilio Ferrara, Pasquale De Meo, Giacomo Fiumara, and Robert Baumgartner. Web data extraction, applications and techniques: A survey. Knowledge-based systems, 70:301-323, 2014.

Eynollah Khanjari et al. 'A new effective method for labeling dynamic XML data', Journal of Big Data, vol. 5, No. 50, pp. 1-17, Dec. 19, 2018.

Frank F. Xu, Bill Y. Lin, and Kenny Q. Zhu. Automatic Extraction of Commonsense LocatedNear Knowledge. In ACL. 2018.

Furkan Kocayusufoglu, Ying Sheng, Nguyen Vo, James Wendt, Qi Zhao, Sandeep Tata, and Marc Najork. Riser: Learning better representations for richly structured emails. In The World Wide Web Conference, pp. 886-895. ACM, 2019.

Guillaume Lample, Miguel Ballesteros, Sandeep Subramanian, Kazuya Kawakami, and Chris Dyer. Neural architectures for named entity recognition. In HLT-NAACL, 2016.

Hassan A. Sleiman and Rafael Corchuelo. A survey on region extractors from web documents. IEEE Transactions on Knowledge and Data Engineering, 25:1960-1981, 2013.

Hongtao Lin, Jun Yan, Meng Qu, and Xiang Ren. Learning Dual Retrieval Module for Semi-supervised Relation Extraction. In WWW '19: The World Wide Web Conference. 2019.

Hongwei Wang, Fuzheng Zhang, Miao Zhao, Wenjie Li, Xing Xie, and Minyi Guo. Multi-task feature learning for knowledge graph enhanced recommendation. In WWW, 2019.

International Search Report and Written Opinion for Application No. PCT/US2020/015602 dated Oct. 21, 2020.

Jacob Devlin, Ming-Wei Chang, Kenton Lee, and Kristina Toutanova. Bert: Pre-training of deep bidirectional transformers for language understanding. In NAACL-HLT, 2019.

Jeffrey Pennington, Richard Socher, and Christopher D. Manning. Glove: Global vectors for word representation. In Empirical Methods in Natural Language Processing (EMNLP), pp. 1532-1543, 2014.

John D. Lafferty, Andrew McCallum, and Fernando Pereira. Conditional random fields: Probabilistic models for segmenting and labeling sequence data. In ICML, 2001.

Joseph Paul Cohen, Wei Ding, and Abraham Bagherjeiran. Semi-supervised web wrapper repair via recursive tree matching. ArXiv:1505.01303v1, May 6, 2015.

Joseph Paul Cohen, Wei Ding, and Abraham Bagherjeiran. XTreePath: A generalization of XPath to handle real world structural variation. ArXiv:1505.01303v2, Dec. 23, 2017.

Joseph Paul Cohen, Wei Ding, and Abraham Bagherjeiran. XTreePath: A generalization of XPath to handle real world structural variation. ArXiv:1505.01303v3, Dec. 27, 2017.

Jun Zhu, Zaiqing Nie, Ji-Rong Wen, Bo Zhang, and Wei-Ying Ma. 2d conditional random fields for web information extraction. In ICML, 2005.

Mandar Joshi, Eunsol Choi, Omer Levy, Daniel Weld, and Luke Zettlemoyer. pair2vec: Compositional word-pair embeddings for cross-sentence inference. In Proceedings of NAACL-HLT, 2019.

Mohd Amir Bin Mohd Azir and Kamsuriah Ahmad. Wrapper approaches for web data extraction : A review. pp. 1-6, 2017.

Nicholas Kushmerick, Daniel S. Weld, and Robert B. Doorenbos. Wrapper induction for information extraction. In IJCAI, 1997.

Pankaj Gulhane, et al. Web-scale information extraction with vertex. 2011 IEEE 27th International Conference on Data Engineering, pp. 1209-1220, 2011.

Pankaj Gulhane, Rajeev Rastogi, Srinivasan H. Sengamedu, and Ashwin Tengli. Exploiting content redundancy for web information extraction. In WWW, 2010.

Qiang Hao, Rui Cai, Yanwei Pang, and Lei Zhang. From one tree to a forest: a unified solution for structured web data extraction. In SIGIR, 2011.

(56) References Cited

OTHER PUBLICATIONS

Rakshit Trivedi, Hanjun Dai, Yichen Wang, and Le Song. Know-evolve: Deep temporal reasoning for dynamic knowledge graphs. In ICML, 2017.
Sen Wu, Luke Hsiao, Xiao Cheng, Braden Hancock, Theodoros Rekatsinas, Philip Levis, and Christopher Ré. Fonduer: Knowledge base construction from richly formatted data. Proceedings of the 2018 International Conference on Management of Data, 2018.
Sergey Melnik, Andrey Gubarev, Jing Jing Long, Geoffrey Romer, Shiva Shivaku-mar, Matt Tolton, and Theo Vassilakis. Dremel: interactive analysis of web-scale datasets. Commun. ACM, 54:114-123, 2011.
Steven Bird, Ewan Klein, and Edward Loper. Natural language processing with Python: analyzing text with the natural language toolkit. "O'Reilly Media, Inc." 504 Pages. 2009.
Tom Kwiatkowski, et al., 2019. Natural Questions: A Benchmark for Question Answering Research. Transactions of the Association for Computational Linguistics 7 (2019), 453-466.
Valter Crescenzi, Giansalvatore Mecca, and Paolo Merialdo. Road-runner: Towards automatic data extraction from large web sites. In VLDB, 2001.
Wanyun Cui, Yanghua Xiao, Haixun Wang, Yangqiu Song, Seung won Hwang, and Wei Yang Wang. Kbqa: Learning question answering over qa corpora and knowledge bases. PVLDB, 10:565-576, 2017.
Wei Shen, Jianyong Wang, and Jiawei Han. 2015. Entity Linking with a Knowledge Base: Issues, Techniques, and Solutions. IEEE Transactions on Knowledge and Data Engineering 27 (2015), 443-460.
Weizhi Ma, Min Zhang, Yue Cao, Woojeong Jin, Chenyang Wang, Yiqun Liu, Shaoping Ma, and Xiang Ren. Jointly learning explainable rules for recommendation with knowledge graph. In WWW, 2019.
Wenxuan Zhou, et al. Nero: A neural rule grounding framework for label-efficient relation extraction. arXiv:1909.02177v1, Sep. 5, 2019.
Wenxuan Zhou, et al. Nero: A neural rule grounding framework for label-efficient relation extraction. arXiv:1909.02177v2, Sep. 20, 2019.
Wenxuan Zhou, et al. Nero: A neural rule grounding framework for label-efficient relation extraction. arXiv:1909.02177v3, Nov. 1, 2019.
Wenxuan Zhou, et al. Nero: A neural rule grounding framework for label-efficient relation extraction. In Proceedings of The Web Conference 2020, WWW '20, pp. 2166-2176, New York, NY, 2020. Assoc. for Computing Machinery. arXiv:1909.02177v4, Jan. 15, 2020.
Xiang Li, Yanxu Zhu, Gang Yin, Tao Wang, and Huaimin Wang. Exploiting attribute redundancy in extracting open source forge websites. 2012 International Conference on Cyber-Enabled Distributed Computing and Knowledge Discovery, pp. 13-20, 2012.
Xiang Ren, Wenqi He, Meng Qu, Lifu Huang, Heng Ji, and Jiawei Han. Afet: Automatic fine-grained entity typing by hierarchical partial-label embedding. In EMNLP, 2016.
Xin Dong, Evgeniy Gabrilovich, Geremy Heitz, Wilko Horn, Kevin Murphy, Shaohua Sun, and Wei Zhang. From data fusion to knowledge fusion. PVLDB, 7: 881-892, 2014.
Xin Dong, Evgeniy Gabrilovich, Geremy Heitz, Wilko Horn, Ni Lao, Kevin Murphy, Thomas Strohmann, Shaohua Sun, and Wei Zhang. Knowledge vault: a web-scale approach to probabilistic knowledge fusion. In KDD, 2014.
Xuezhe Ma and Eduard Hovy. End-to-end sequence labeling via bi-directional LSTM-CNNs-CRF. arXiv:1603.01354v1, Mar. 4, 2016.
Xuezhe Ma and Eduard Hovy. End-to-end sequence labeling via bi-directional LSTM-CNNs-CRF. arXiv:1603.01354v2, Mar. 7, 2016.
Xuezhe Ma and Eduard Hovy. End-to-end sequence labeling via bi-directional LSTM-CNNs-CRF. arXiv:1603.01354v3, Mar. 8, 2016.
Xuezhe Ma and Eduard Hovy. End-to-end sequence labeling via bi-directional LSTM-CNNs-CRF. arXiv:1603.01354v4, Mar. 14, 2016.
Xuezhe Ma and Eduard Hovy. End-to-end sequence labeling via bi-directional LSTM-CNNs-CRF. arXiv:1603.01354v5, Mar. 29, 2016.
Yan Xu, Lili Mou, Ge Li, Yunchuan Chen, Hao Peng, and Zhi Jin. Classifying Relations via Long Short Term Memory Networks along Shortest Dependency Paths. In EMNLP. 2015.
Yan Xu, Ran Jia, Lili Mou, Ge Li, Yunchuan Chen, Yangyang Lu, and Zhi Jin. Improved relation classification by deep recurrent neural networks with data augmentation. In COLING. 2016.
Yanhong Zhai and Bing Liu. Web data extraction based on partial tree alignment. In WWW, 2005.
Yujie Qian, Enrico Santus, Zhijing Jin, Jiang Guo, and Regina Barzilay. Graphie: A graph-based framework for information extraction. In NAACL-HLT, 2018.
Zhiyi Luo, Shanshan Huang, Frank F. Xu, Bill Yuchen Lin, Hanyuan Shi, and Kenny Q. Zhu. Extra: Extracting prominent review aspects from customer feedback. In EMNLP, 2018.
Zichao Yang, Diyi Yang, Chris Dyer, Xiaodong He, Alexander J. Smola, and Eduard H. Hovy. Hierarchical attention networks for document classification. In HLT-NAACL, 2016.
Alon Talmor, et al. The web as a knowledge-base for answering complex questions. In Proceedings of the 2018 Conference of the North American Chapter of the Association for Computational Linguistics: Human Language Technologies, vol. 1 pp. 641-651, Jun. 2018.
Zhilin Yang, et al. HotpotQA: A Dataset for Diverse, Explainable Multi-hop Question Answering. In Proceedings of the Conference on Empirical Methods in Natural Language Processing (EMNLP). 2018.
China Intellectual Property Office, First Office Action issued in Application No. 202311184681.7, 12 pages, dated Oct. 1, 2025.
China Intellectual Property Office, Second Office Action issued in Application No. 202311184681.7, 6 pages, dated May 1, 2026.
China Intellectual Property Office, Notice of Allowance issued in Application No. 202311184681.7, 5 pages, dated Jul. 9, 2026.

* cited by examiner

200

300

400

500

700

800

900

1000

<u>1100</u>

1200

TRANSFERABLE NEURAL ARCHITECTURE FOR STRUCTURED DATA EXTRACTION FROM WEB DOCUMENTS

CROSS-REFERENCE TO RELATED APPLICATIONS

The present application is a continuation of U.S. patent application Ser. No. 17/792,788, filed Jul. 14, 2022, which a national phase entry under 35 U.S.C. § 371 of International Application No. PCT/US2020/015602, filed Jan. 29, 2020, published in English, the entire disclosure of which is incorporated herein by reference.

BACKGROUND

Since the advent of the Internet, there has been a need for systems and methods of gathering, organizing, and presenting the information from multiple websites so that users can effectively and efficiently find what they are looking for. This can be seen in the continuing development of search engines and algorithms, which allow users to identify and visit websites that contain information of interest. In addition, with the introduction of artificial intelligence-based recommendation systems and automated digital assistants, it has become possible to obtain information without personally visiting the source website. As the amount of information available on the Internet continues to grow, it becomes increasingly difficult for computing systems to effectively parse and catalog relevant information.

BRIEF SUMMARY

The present technology relates to systems and methods for efficiently extracting machine-actionable structured data from web documents. Using various neural network architectures, the technology is able to utilize the raw Hypertext Markup Language ("HTML") content of a small set of seed websites to create transferrable models regarding information of interest. Those models can then be applied to the raw HTML of other websites to identify similar information of interest without further human input, and to extract it as structured data for further use by the system and/or other systems. The technology is thus less computationally expensive than systems and methods that rely upon visual rendering and can provide improved results tailored to the information of interest. In addition, unlike other text-based methods that require specific extraction programs to be built for each domain, the present technology provides an enhanced technical benefit by generating models that can be used across multiple domains, to enable extraction of machine-actionable structured data in a functional form that can be used by further systems.

In one aspect, the disclosure describes a computer-implemented method of extracting machine-actionable data. The method comprises: generating, by one or more processors of a processing system, a document object model tree for a first page of a first website, wherein the document object model tree comprises a plurality of nodes, and each node in the plurality of nodes includes an XML Path ("XPath") and content; identifying, by the one or more processors, a first node of the plurality of nodes, wherein the content of the first node comprises a first sequence of words, and each word in the first sequence comprises one or more characters; identifying, by the one or more processors, a second node of the plurality of nodes, wherein the content of the second node comprises a second sequence of words, each word in the second sequence comprises one or more characters, and the second sequence precedes the first sequence on the first page; generating, by the one or more processors, a word-level vector corresponding to each word of the first sequence and the second sequence; generating, by the one or more processors, a character-level word vector corresponding to each word of the first sequence and the second sequence; generating, by the one or more processors, a sequence-level vector based on the word-level vectors and the character-level word vectors corresponding to the first sequence; generating, by the one or more processors, a sequence-level vector based on the word-level vectors and the character-level word vectors corresponding to the second sequence; generating, by the one or more processors, a discrete-features vector corresponding to one or more predefined features in the content of the first node; concatenating, by the one or more processors, the sequence-level vector corresponding to the first sequence, the sequence-level vector corresponding to the second sequence, and the discrete-features vector to obtain a comprehensive vector for the first node; generating, by the one or more processors, a node label for the first node based on the comprehensive vector for the first node; and extracting, by the one or more processors, structured data from the first node, the structured data associating the content of the first node with the node label for the first node. In some aspects, generating the character-level word vector corresponding to each word of the first sequence and the second sequence comprises, for each word in the first sequence, encoding a character vector corresponding to each of the one or more characters using a convolutional neural network, and, for each word in the second sequence, encoding a character vector corresponding to each of the one or more characters using a convolutional neural network. In some aspects, generating the sequence-level vector based on the word-level vectors and the character-level word vectors corresponding to the first sequence comprises encoding the character-level word vector and the word-level vector of each word of the first sequence using a bidirectional long short-term memory neural network. In some aspects, generating the sequence-level vector based on the word-level vectors and the character-level word vectors corresponding to the second sequence comprises encoding the character-level word vector and the word-level vector of each word of the second sequence using a bidirectional long short-term memory neural network. In some aspects, generating the node label for the first node based on the comprehensive vector for the first node comprises encoding the comprehensive vector for the first node using a multi-layer perceptron neural network to obtain a classification for the first node. In some aspects, the node label for the first node corresponds to one of a plurality of fields-of-interest. The method may further comprise: generating, by the one or more processors, a second document object model tree for a second page of the first website, wherein the second document object model tree comprises a second plurality of nodes, and each node in the second plurality of nodes includes an XPath and content; and extracting, by the one or more processors, a second set of structured data from the second plurality of nodes, wherein the second set of structured data associates the content of each node in the second plurality of nodes with a node label for each node in the second plurality of nodes. Further still, the method may additionally comprise: generating, by the one or more processors, a third document object model tree for a page of a second website, wherein the third document object model tree comprises a third plurality of nodes, and each node in the third plurality of nodes includes an XPath and content;

and extracting, by the one or more processors, a third set of structured data from the third plurality of nodes, wherein the third set of structured data associates the content of each node in the third plurality of nodes with a node label for each node in the third plurality of nodes.

In another aspect, the disclosure describes a computer-implemented method of extracting data, comprising: generating, by one or more processors of a processing system, a document object model tree for a first page of a first website, wherein the document object model tree comprises a first plurality of nodes, and each node in the first plurality of nodes includes an XML Path ("XPath") and content; generating, by the one or more processors, a prediction for each node of the first plurality of nodes regarding whether the node relates to one of a plurality of fields-of-interest; generating, by the one or more processors, a plurality of node-pairs from the first plurality of nodes, wherein each node-pair of the plurality comprises a head node and tail node; generating, by the one or more processors, a comprehensive vector corresponding to each head node and each tail node; generating, by the one or more processors, an XPath vector corresponding to each head node and each tail node; generating, by the one or more processors, a positional vector corresponding to each head node and each tail node based at least in part on a position of each head node and each tail node relative to at least one other node of the first plurality of nodes; for each node-pair, concatenating, by the one or more processors, the comprehensive vectors, the positional vectors, and the XPath vectors corresponding to the head node and the tail node of the node-pair to obtain a pair-level vector; generating, by the one or more processors, a pair label for each node-pair based on the pair-level vector for the node-pair; generating, by the one or more processors, for the head node of each node-pair, a node label based on the pair label for the node-pair or the prediction for the head node; generating, by the one or more processors, for the tail node of each node-pair, a node label based on the pair label for the node-pair or the prediction for the tail node; and extracting, by the one or more processors, structured data from one or more nodes of the first plurality of nodes, the structured data associating the content of each of the one or more nodes with the node label for each of the one or more nodes. In some aspects, generating the XPath vector corresponding to each head node and each tail node comprises encoding the XPaths of each head node and each tail node using a long short-term memory neural network. In some aspects, generating the comprehensive vector corresponding to each head node and each tail node comprises: for each head node, concatenating a sequence-level vector corresponding to a sequence of words in the head node, a sequence-level vector corresponding to a sequence of words in a node preceding the head node, and a discrete-features vector corresponding to one or more predefined features in the content of the head node; and for each tail node, concatenating a sequence-level vector corresponding to a sequence of words in the tail node, a sequence-level vector corresponding to a sequence of words in a node preceding the tail node, and a discrete-features vector corresponding to one or more predefined features in the content of the tail node. In some aspects, generating a pair label for each node-pair based on the pair-level vector comprises encoding the pair-level vector for each node-pair using a multi-layer perceptron neural network to obtain a classification for each node-pair. In some aspects, the node labels correspond to one of the plurality of fields-of-interest or a null identifier. The method may further comprise: generating, by the one or more processors, a second document object model tree for a second page of the first website, wherein the second document object model tree comprises a second plurality of nodes, and each node in the second plurality of nodes includes an XPath and content; and extracting, by the one or more processors, a second set of structured data from the second plurality of nodes, wherein the second set of structured data associates the content of each node in the second plurality of nodes with a node label for each node in the second plurality of nodes. Further still, the method may additionally comprise: generating, by the one or more processors, a third document object model tree for a page of a second website, wherein the third document object model tree comprises a third plurality of nodes, and each node in the third plurality of nodes includes an XPath and content; and extracting, by the one or more processors, a third set of structured data from the third plurality of nodes, wherein the third set of structured data associates the content of each node in the third plurality of nodes with a node label for each node in the third plurality of nodes. The method may further comprise: generating, by one or more processors, a second document object model tree for a second page of the first website, wherein the second document object model tree comprises a second plurality of nodes, and each node in the second plurality of nodes includes an XPath and content; generating, by the one or more processors, a node label for each node of the second plurality of nodes; identifying, by the one or more processors, a class of nodes from the first plurality of nodes and the second plurality of nodes, wherein the node label for each node in the class of nodes is the same; identifying, by the one or more processors, a first XPath that is a most common XPath in the class of nodes; and extracting, by the one or more processors, from each node in the first plurality of nodes and the second plurality of nodes that has the first XPath, a second set of structured data that associates the content of the node with the node label for the node.

In another aspect, the disclosure describes a processing system for extracting machine-actionable data. The processing system comprises a memory, and one or more processors coupled to the memory and configured to: generate a document object model tree for a first page of a first website, wherein the document object model tree comprises a plurality of nodes, and each node in the plurality of nodes includes an XML Path ("XPath") and content; identify a first node of the plurality of nodes, wherein the content of the first node comprises a first sequence of words, and each word in the first sequence comprises one or more characters; identify a second node of the plurality of nodes, wherein the content of the second node comprises a second sequence of words, each word in the second sequence comprises one or more characters, and the second sequence precedes the first sequence on the first page; generate a word-level vector corresponding to each word of the first sequence and the second sequence; generate a character-level word vector corresponding to each word of the first sequence and the second sequence; generate a sequence-level vector based on the word-level vectors and the character-level word vectors corresponding to the first sequence; generate a sequence-level vector based on the word-level vectors and the character-level word vectors corresponding to the second sequence; generate a discrete-features vector corresponding to one or more predefined features in the content of the first node; concatenate the sequence-level vector corresponding to the first sequence, the sequence-level vector corresponding to the second sequence, and the discrete-features vector to obtain a comprehensive vector for the first node; generate a node label for the first node based on the comprehensive vector for the first node; and extract structured data from the first node, wherein the structured data associates the content of the first node with the node label for the first node. In some aspects, the node label for the first node corresponds to one of a plurality of fields-of-interest.

In another aspect, the disclosure describes a processing system for extracting machine-actionable data, comprising a memory, and one or more processors coupled to the memory and configured to: generate a document object model tree for a first page of a first website, wherein the document object model tree comprises a first plurality of nodes, and each node in the first plurality of nodes includes an XML Path ("XPath") and content; generate a prediction for each node of the first plurality of nodes regarding whether the node relates to one of a plurality of fields-of-interest; generate a plurality of node-pairs from the first plurality of nodes, wherein each node-pair of the plurality comprises a head node and tail node; generate a comprehensive vector corresponding to each head node and each tail node; generate an XPath vector corresponding to each head node and each tail node; generate a positional vector corresponding to each head node and each tail node based at least in part on a position of each head node and each tail node relative to at least one other node of the first plurality of nodes; for each node-pair, concatenate the comprehensive vectors, the positional vectors, and the XPath vectors corresponding to the head node and the tail node of the node-pair to obtain a pair-level vector; generate a pair label for each node-pair based on the pair-level vector for the node-pair; generate, for the head node of each node-pair, a node label based on the pair label for the node-pair or the prediction for the head node; generate, for the tail node of each node-pair, a node label based on the pair label for the node-pair or the prediction for the tail node; and extract structured data from one or more nodes of the first plurality of nodes, wherein the structured data associates the content of each of the one or more nodes with the node label for each of the one or more nodes. In some aspects, the node labels correspond to one of the plurality of fields-of-interest or a null value.

DETAILED DESCRIPTION

The present technology will now be described with respect to the following exemplary systems and methods.

Example Systems

Figure 1:
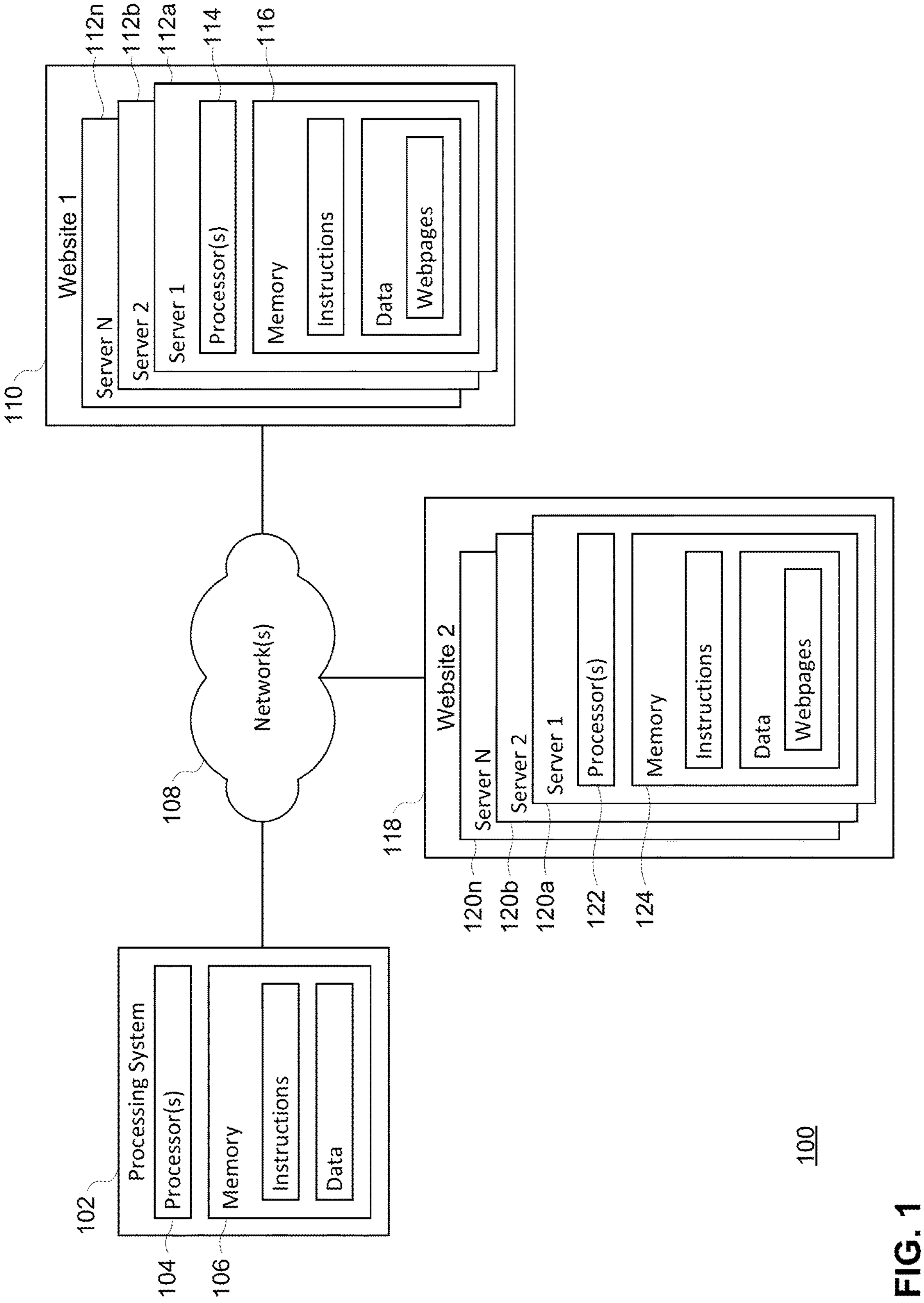
FIG. 1 is a functional diagram of an example system in accordance with aspects of the disclosure.

FIG. 1 schematically illustrates an arrangement 100 with an exemplary processing system 102 for performing the methods described herein. The processing system 102 includes one or more processors 104 and memory 106 storing instructions and data. In addition, the one or more processors 104 may include the various modules described herein, and the instructions and data may include the various neural networks described herein. The processing system 102 is shown being in communication with various websites, including websites 110 and 118, over one or more networks 108. Exemplary websites 110 and 118 each include one or more servers 112*a*-112*n* and 120*a-n*, respectively. Each of the servers 112*a*-112*n* and 120*a-n* may have one or more processors (e.g., 114 and 122), and associated memory (e.g., 116 and 124) storing instructions and data, including the HTML of one or more webpages. However, various other topologies are also possible. For example, the processing system 102 may not be in direct communication with the websites, and may instead process stored versions of the HTML of the websites to be processed.

Processing system 102 may be implemented on different types of computing device(s), such as any type of general computing device, server, or set thereof, and may further include other components typically present in general purpose computing devices or servers. The memory 106 stores information accessible by the one or more processors 104, including instructions and data that may be executed or otherwise used by the processor(s) 104. The memory may be of any non-transitory type capable of storing information accessible by the processor(s) 104. For instance, the memory may include a non-transitory medium such as a hard-drive, memory card, optical disk, solid-state, tape memory, or the like. Computing devices suitable for the roles described herein may include different combinations of the foregoing, whereby different portions of the instructions and data are stored on different types of media.

In all cases, the computing devices described herein may further include any other components normally used in connection with a computing device such as a user interface subsystem. The user interface subsystem may include one or more user inputs (e.g., a mouse, keyboard, touch screen and/or microphone) and one or more electronic displays (e.g., a monitor having a screen or any other electrical device that is operable to display information). Output devices besides an electronic display, such as speakers, lights, and vibrating, pulsing, or haptic elements, may also be included in the computing devices described herein.

The one or more processors included in each computing device may be any conventional processors, such as commercially available central processing units ("CPUs"), tensor processing units ("TPUs"), etc. Alternatively, the one or more processors may be a dedicated device such as an ASIC or other hardware-based processor. Each processor may have multiple cores that are able to operate in parallel. The processor(s), memory, and other elements of a single computing device may be stored within a single physical housing, or may be distributed between two or more housings.

Similarly, the memory of a computing device may include a hard drive or other storage media located in a housing different from that of the processor(s), such as in an external database or networked storage device. Accordingly, references to a processor or computing device will be understood to include references to a collection of processors or computing devices or memories that may or may not operate in parallel, as well as one or more servers of a load-balanced server farm or cloud-based system.

The computing devices described herein may store instructions capable of being executed directly (such as machine code) or indirectly (such as scripts) by the processor(s). The computing devices may also store data, which may be retrieved, stored, or modified by one or more processors in accordance with the instructions. Instructions may be stored as computing device code on a computing device-readable medium. In that regard, the terms "instructions" and "programs" may be used interchangeably herein. Instructions may also be stored in object code format for direct processing by the processor(s), or in any other computing device language including scripts or collections of independent source code modules that are interpreted on demand or compiled in advance. By way of example, the programming language may be C#, C++, JAVA or another computer programming language. Similarly, any components of the instructions or programs may be implemented in a computer scripting language, such as JavaScript, PHP, ASP, or any other computer scripting language. Furthermore, any one of these components may be implemented using a combination of computer programming languages and computer scripting languages.

Example Methods

In addition to the systems described above and illustrated in the figures, various operations will now be described. In that regard, there are multiple ways that processing system 102 could be configured to extract structured data from websites. For example, processing system 102 could be configured to use a site-specific extraction program or "wrapper" for each website from which data is to be extracted. However, site-specific approaches generally require either a human to analyze the site and create a wrapper to be used by the extraction program, or that the pages of the website be sufficiently well-annotated that the extraction program can accurately identify the preselected fields-of-interest without human input. In either case, the wrappers created for one site will not be transferrable to a different site. Fields-of-interest may be any categories of information that are selected for extraction. For example, for a website relating to automobiles, fields-of-interest may include model name, vehicle type, gas mileage, engine size, engine power, engine torque, etc.

In other cases, neural networks can be trained on a set of rendered webpages to identify information of interest using various visual cues. However, while visual-rendering approaches can generate models that allow fields-of-interest to be identified and extracted from other websites, they require careful feature-engineering with domain-specific knowledge in order to generate the models, and are computationally expensive due to the rendering.

In view of these drawbacks, the present technology provides neural network architectures that can use the text of a set of seed websites to create transferrable extraction models with minimal or no human input, and without the need for rendering. Those extraction models can then be used to identify and extract information of interest in the text of additional websites without the need for any rendering of webpages.

Figure 2:
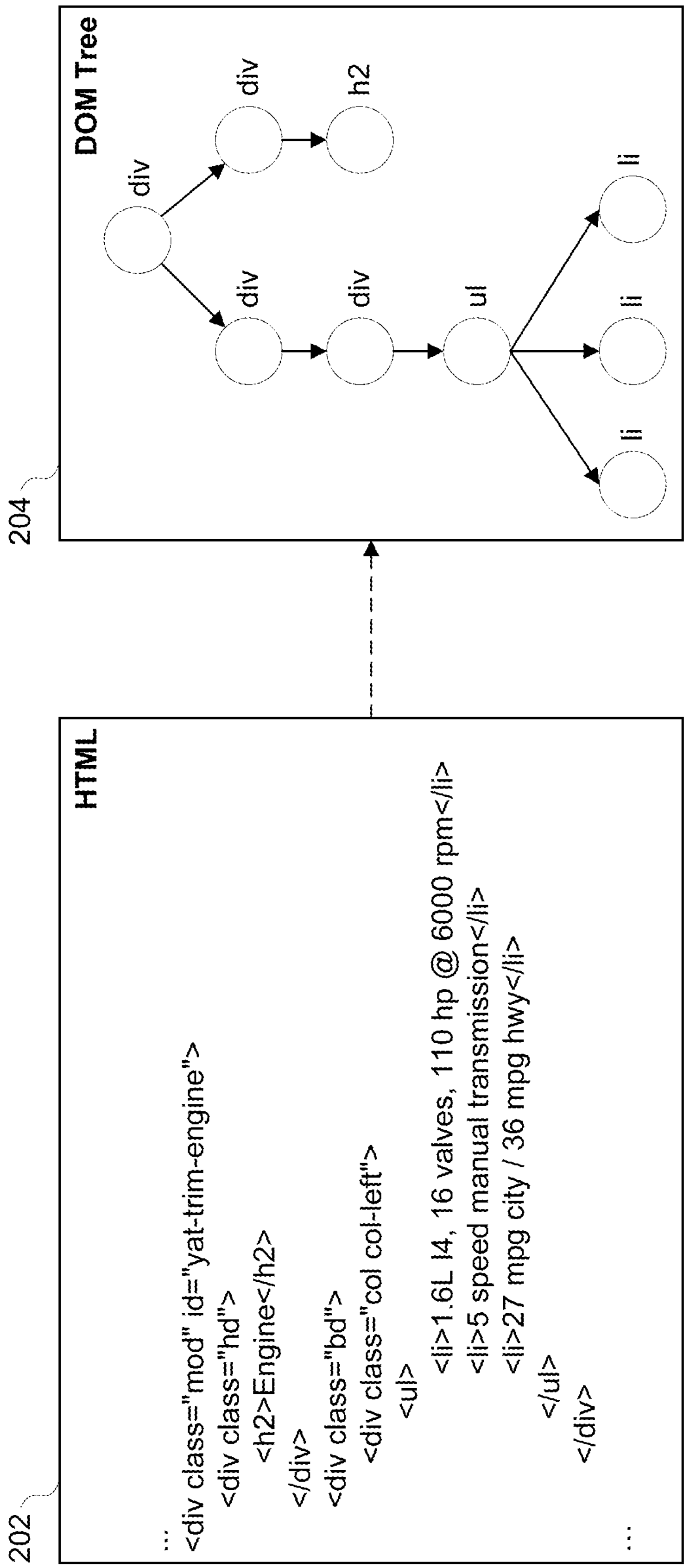
FIG. 2 is a diagram showing how a section of HTML may be represented as a DOM Tree.

In that regard, in an exemplary method according to aspects of the technology, a processing system first applies a node-level module to a set of selected seed websites. The seed websites may be chosen based on various attributes. For example, some websites will already include annotations that identify various fields-of-interest. In that regard, on an exemplary automobile websites, the pages for each vehicle may have a table with a row that states "model" and then lists the model name, a row that states "engine" and then lists the engine size, a row that states "gas mileage" and then lists the gas mileage, etc. Sites with one or more annotations related to the preselected fields-of-interest may be helpful as seed websites, as they may allow the neural networks to generate models that can more accurately identify fields-of-interest in other websites with fewer annotations. The node-level module parses the raw HTML of each page of each seed web site as Document Object Model ("DOM") Trees. This converts each page into a tree structure, in which each branch ends in a node, and each node includes an XML Path ("XPath") and its associated HTML content. For example, illustration 200 of FIG. 2 shows how a section of HTML 202 may be represented as a DOM Tree 204. While the nodes of the DOM Tree 204 are shown in FIG. 2 as empty circles, in actuality they would include the HTML content associated with each node.

Figure 3:
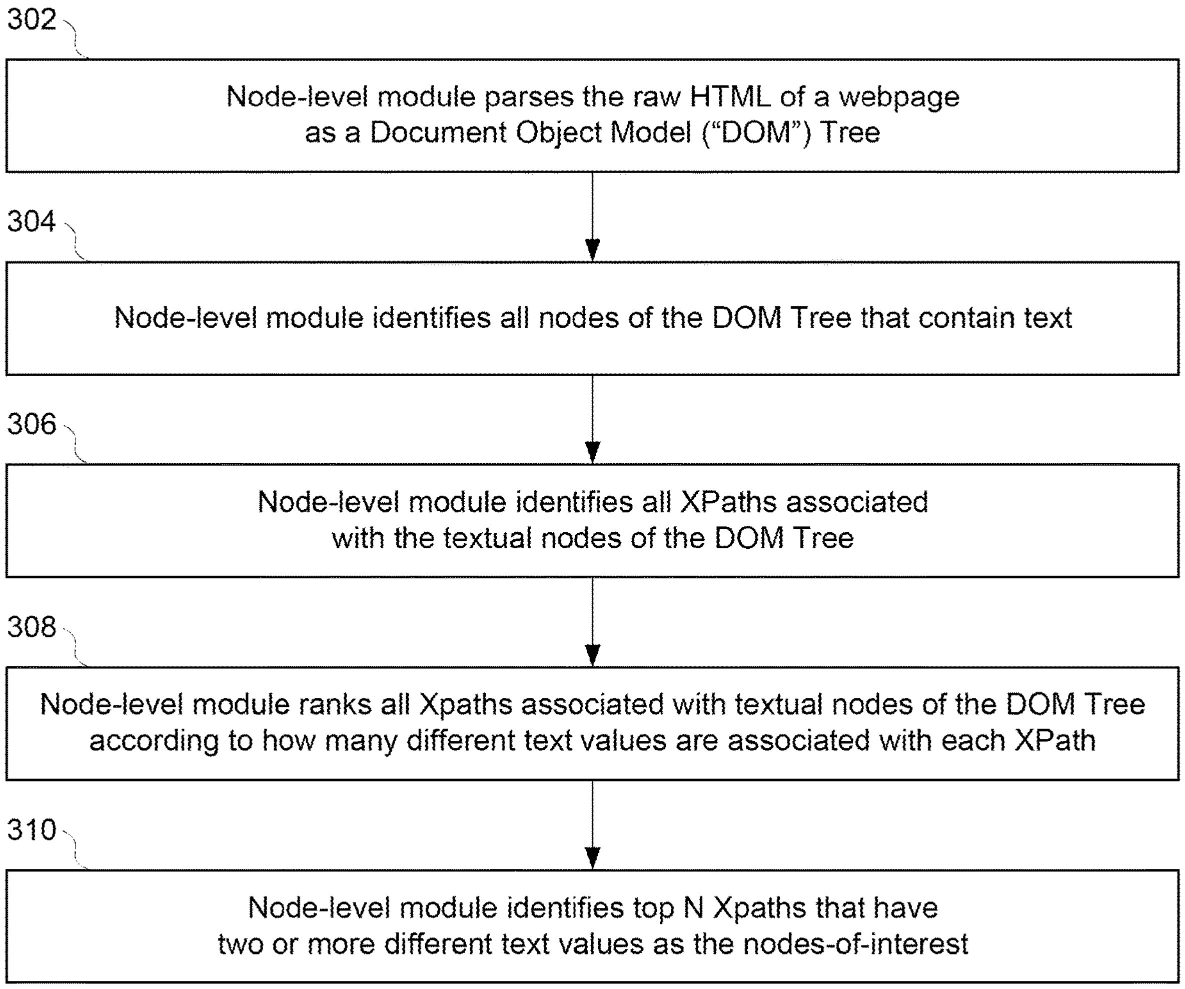
FIG. 3 is a flow diagram of an exemplary method in accordance with aspects of the disclosure.

The node-level module next identifies all nodes that contain text, and filters the list of all such textual nodes to remove those that are unlikely to convey information of interest. This can be done, for example, by collecting all possible XPaths (node identifiers) of textual nodes in a given website, ranking the XPaths by the number of different text values associated with each XPath, and identifying some subset of those that have two or more different values as the nodes-of-interest. A flow diagram 300 showing this exemplary filtering method is included as FIG. 3. In that regard, in step 302, the node-level module parses the raw HTML of a webpage as a DOM Tree. In step 304, the node-level module identifies all nodes of the DOM Tree that contain text. In step 306, the node-level module identifies all XPaths that are associated with the textual nodes of the DOM Tree. In step 308, the node-level module ranks all XPaths according to how many different text values are associated with each such XPath. In step 310, the node-level module identifies as the "nodes-of-interest" the top N XPaths that have two or more different text values. Thus, in some examples, the node-level module may rank the XPaths by the number of different values associated with them, and select the top 500 XPaths (or more or less) that have at least two different values. Filtering in this way will remove most of the nodes that have common values across multiple pages, and therefore are more likely to represent generic text of the pages in that website such as the name of the website, navigation text, headers, footers, copyright information, etc.

The node-level module next encodes the filtered set of textual nodes (the "nodes-of-interest") using the text of each node, the text preceding each node, and one or more discrete features (e.g., content in the raw HTML that may be helpful in identifying fields-of-interest). Each of these encoding processes utilizes different neural networks, as will be described in further detail below with respect to FIGS. 4-9.

Figure 4:
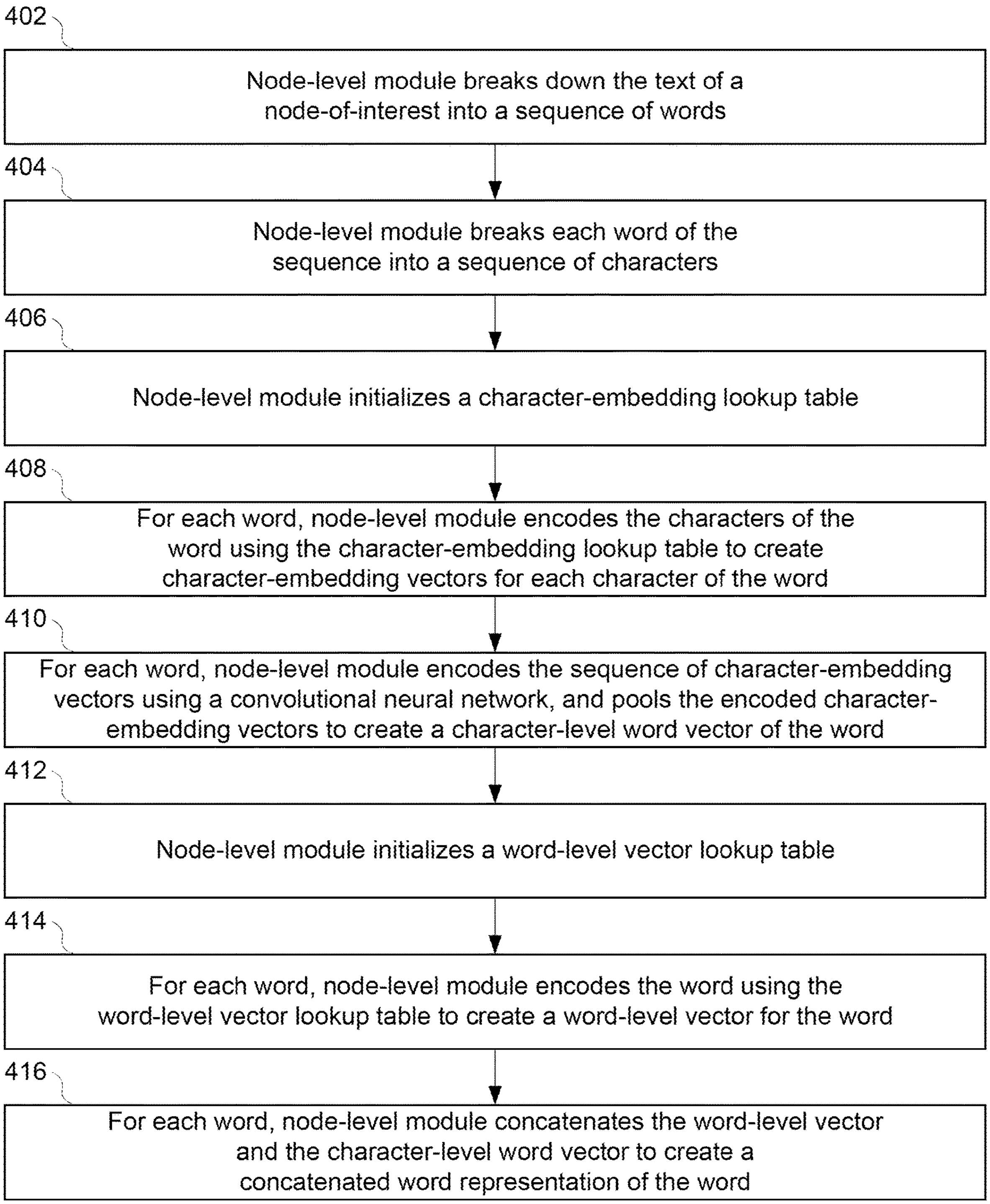
FIG. 4 is a flow diagram of an exemplary method in accordance with aspects of the disclosure.

In that regard, as shown in step 402 of approach 400 of FIG. 4, when encoding based on the text of each node, the node-level module breaks each node's text down into a sequence of words W, consisting of $\{w_1, w_2, \ldots, w_{|n|}\}$. The sequence of words $\{w_1, w_2, \ldots, w_{|n|}\}$ be the original text of the node, or may be the results of subjecting the original text to lexical analysis, such as by tokenizing and lemmatizing the original text using the Natural Language Toolkit ("NLTK"). Thus, for each node, each word $w_i$ can be expressed according to Equation 1 below as being an element of W. As used herein, a "word" need not be comprised of letters, and can thus include text comprised of numbers and/or symbols, such as "$1,000."

$$w_i \in W \tag{1}$$

As shown in step 404, the node-level module further breaks each word $w_i$ into a sequence of characters C, consisting of $\{c_1, c_2, \ldots, c_{|w|}\}_i$. Thus, for a given word $w_i$ of a node, each character c j can be expressed according to Equation 2 as being an element of C.

$$c_j \in C \tag{2}$$

A character-embedding lookup table $E_c$ is also initialized, as shown in step 406. Step 406 may take place before steps 402 and/or 404. Character-embedding lookup table $E_c$ is defined according to Equation 3, in which $dim_c$ is a hyper-parameter representing the dimension of character-embedding vectors, and $\mathbb{R}$ is a symbol representing all real numbers. Thus, character-embedding lookup table $E_c$ is a matrix of shape $|C| \times dim_c$, and each element in the matrix is a real number. The character-embedding vectors of $E_c$ are randomly initialized, and then updated during model training through back-propagation. The dimension of character-embedding vectors may be any suitable number, such as 100 (or more or less).

$$E_c \in \mathbb{R}^{|C| \times dim_c} \tag{3}$$

As shown in step 408, for each word $w_i$, a character-embedding vector is generated for each character $c_j$ using character-embedding lookup table $E_c$. Next, in step 410, a convolutional neural network ("CNN") is used to encode the entire sequence of character-embedding vectors for each word $w_i$, and then pool them to create a character-level word vector $c^i$ corresponding to word $w_i$. Character-level word vector $c^i$ can thus be expressed according to Equation 4 below. These steps are also represented pictorially in FIG. 6, in which the exemplary phrase "city 25 hwy 32" is processed to create individual character-embedding vectors for each word 602*a*-602*d*. Each set of character-embedding vectors for each word is then fed into CNN 606 and pooled to create corresponding character-level word vectors 608*a*-608*d*. The CNN may be implemented with any suitable parameters. For example, the CNN may employ a kernel size of 3 (or more or less), a filter size of 50 (or more or less), and may apply max pooling to select the maximum value from each row of the resulting matrix and thus reduce each row to a single value.

$$c^i = CNN(\{c_1, c_2, \ldots, c_{|w|}\}) \tag{4}$$

In addition, as shown in step 412, a word-level vector lookup table $E_w$ is also initialized for each word $w_i$. Here as well, step 412 may take place before any or all of steps 402-410. Word-level vector lookup table $E_w$ is defined according to Equation 5 below, in which $dim_w$, is a hyper-parameter representing the dimension of word-level vectors. The word-level vectors in $E_w$ may be generated from various known algorithms, such as Stanford's GloVe. Thus, word-level vector lookup table $E_w$ is a matrix of shape $|W| \times dim_w$, and each element in the matrix is a real number. The dimension of character-embedding vectors may be any suitable number, such as 100 (or more or less).

$$E_w \in \mathbb{R}^{|W| \times dim_w} \tag{5}$$

As shown in step 414, a word-level vector $w^i$ for each word $w_i$ is generated using word-level vector lookup table $E_w$. Then, as shown in step 416, for each word $w_i$, the word-level vector $w^i$ is concatenated with the character-level word vectors $c^i$ created by the CNN to create a concatenated word vector $t_i$ for every word $w_i$ in each node. This is shown in Equation 6 below, in which $[\cdot \odot \cdot]$ denotes concatenation operations. These steps are also represented pictorially in FIG. 6, in which each word 604*a*-604*d* of the phrase "city 25 hwy 32" is processed to create corresponding word-level vectors 610*a*-610*d*. Those word-level vectors 610*a*-610*d* are then concatenated with the associated character-level word vectors 608*a*-608*d* to form concatenated word vectors 612*a*-612*d*.

$$t_i = [w^i \odot c^i] \tag{6}$$

Figure 5:
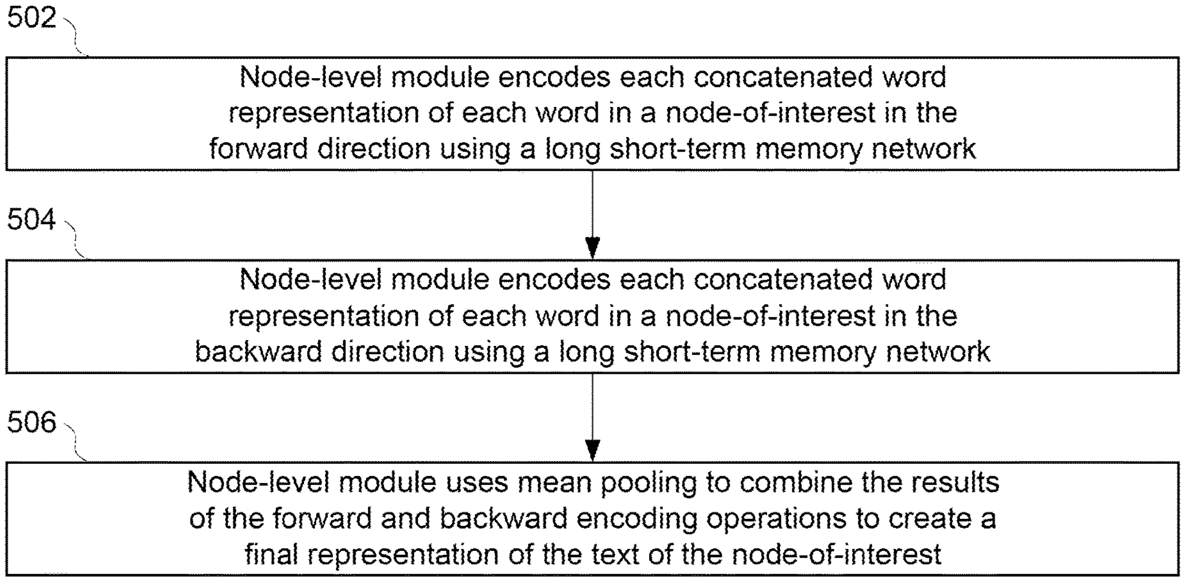
FIG. 5 is a flow diagram of an exemplary method in accordance with aspects of the disclosure.
Figure 6:
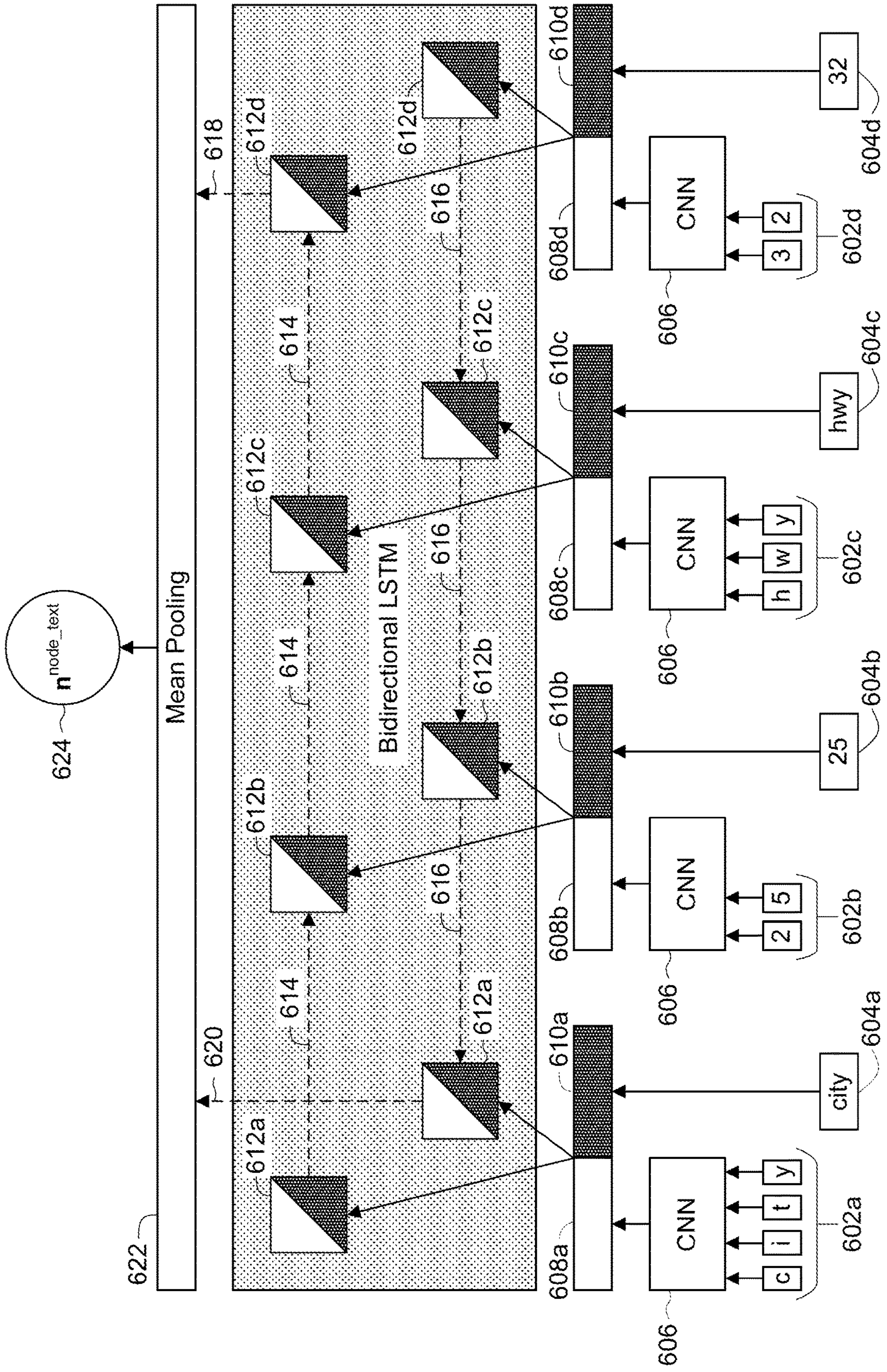
FIG. 6 is a diagram showing how an exemplary phrase may be processed in accordance with aspects of the disclosure.

As a result of the above, for the set of all words W in a given node, there will be a set of concatenated word vectors consisting of $\{t_1, t_2, \ldots, t_{|n|}\}$. Next, as shown in FIGS. 5 and 6, a long short-term memory ("LSTM") neural network is used to contextually encode this set of concatenated word vectors both forward and backward. In other words, the LSTM network will encode the set $\{t_1, t_2, \ldots, t_{|n|}\}$, as well as to the reverse set $\{t_{|n|}, t_{|n|-1}, \ldots, t_1\}$. These processes are described in steps 502 and 504, respectively, of the flow 500 in FIG. 5. The forward and backward LSTM encoding steps are also shown pictorially by dashed lines 614 and 616 of FIG. 6, respectively. Because the LSTM network encodes the sets in two directions, it can also be referred to as a bidirectional long short-term memory neural network. While the LSTM network will have the same structure in both directions, the parameters will be different for the forward and backward encoding operations. The LSTM network may employ any suitable number of units, such as 100 (or more or less). The results of the forward and backward LSTM encoding operations will then be subjected to mean pooling to arrive at the final representation of the text of that node, $n^{node\_text}$, as shown in step 506 of FIG. 5. This can be expressed as shown in Equation 7, in which AVG $[\cdot \bigodot \cdot]$ denotes average or mean pooling operations, and in which $LSTM_f$ and $LSTM_b$ denote the LSTM operations in the forward and backward directions, respectively. This is also shown pictorially in FIG. 6, in which the output of the forward and backward LSTM encoding operations are represented by dashed lines 618 and 620, in which the mean pooling of those outputs is shown in element 622, and in which the final vector representation of that text is shown in element 624.

$$n^{node\_text} = AVG[LSTM_f(\{t_1, t_2, \ldots, t_{|n|}\})LSTM_b(\{t_{|n|}, t_{|n|-1}, \ldots, t_1\})] \quad (7)$$

Encoding both the words and the characters of each node's text as described above enables the node-level module to identify patterns shared across nodes even where the individual words of a given node may be unknown (e.g., misspellings, abbreviations, etc.), or where the text of the node includes numbers or special characters. For example, in the context of a website pertaining to automobiles, a node may contain text such as "city 25 hwy 32" as shown in FIG. 6, but a node from another page of that website may contain similar text for another automobile, such as "city 22 hwy 28." Tracking only words, the node-level module may only determine that these nodes share the words "city" and "hwy," the latter of which may not even be recognized as a word as it is merely an abbreviation. But by combining the results of the character-level CNN and word-level LSTM operations as described above, the node-level module can identify that these nodes in fact share a pattern of "city ## hwy ##." Importantly, the node-level module can do this without requiring human input.

As noted above, and as shown in flows 700 and 800 of FIGS. 7 and 8, respectively, the node-level module also encodes the text that precedes each node-of-interest. This encoding may be performed for some fixed amount of preceding text. The node-level module processes the preceding text in the same manner described above with respect to FIGS. 4-6, resulting in a second vector $n^{prev\_text}$. The steps of FIGS. 4 and 5 need not take place before those of FIGS. 7 and 8. Rather, the node-level module may process the preceding text before, after, or simultaneously with its processing of the node text.

Figure 7:
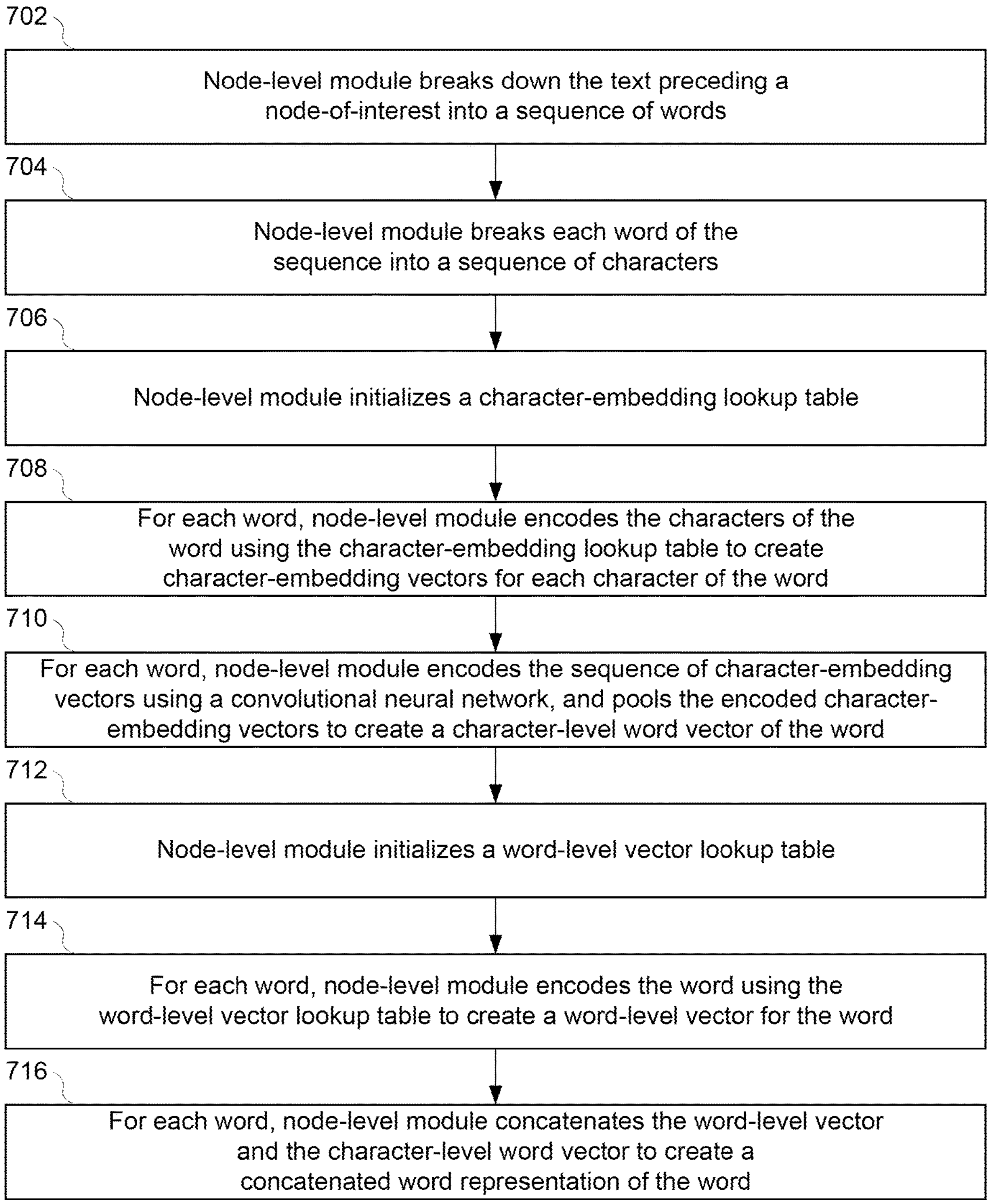
FIG. 7 is a flow diagram of an exemplary method in accordance with aspects of the disclosure.

Thus, as shown in step 702 of FIG. 7, the node-level module breaks down the text preceding a node-of-interest into a sequence of X words. X may be any number, such as 10 words (or more or fewer words). In addition, as described above with respect to step 402 of FIG. 4, the sequence of X words may be the original text that preceded the node-of-interest, or may be the results of subjecting that preceding text to lexical analysis, such as by tokenizing and lemmatizing it using the NLTK toolkit. At step 704, the node-level module breaks each of the X words into a sequence of characters in the same manner described above with respect to step 404 of FIG. 4. At step 706, the node-level module initializes a character-embedding lookup table in the same manner described above with respect to step 406 of FIG. 4. As was the case with the steps of FIG. 4, step 706 of FIG. 7 may take place before steps 702 and/or 704. Further in that regard, the node-level module may utilize the same character-embedding lookup table for the processes of both FIGS. 4 and 7, in which case steps 406 and 706 would each describe a single instance of initializing a character-embedding lookup table. At step 708, the node-level module encodes the characters of each of the X words using the character-embedding lookup table to create corresponding character-embedding vectors, in the same manner described above with respect to step 408 of FIG. 4. At step 710, for each of the X words, the node-level module encodes the corresponding sequence of character-embedding vectors using a CNN and then pools them to create a character-level word vector for each word, in the same manner described above with respect to step 410 of FIG. 4. Step 710 may use the same CNN used in connection with step 410 of FIG. 4, or may use a separate CNN. At step 712, the node-level module initializes a word-level vector lookup table in the same manner described above with respect to step 412 of FIG. 4. Here as well, step 712 of FIG. 7 may take place before any or all of steps 702-710 of FIG. 7. Further in that regard, the node-level module may utilize the same word-level vector lookup table for the processes of both FIGS. 4 and 7, in which case steps 412 and 712 would each describe a single instance of initializing a word-level vector lookup table. At step 714, for each of the X words, the node-level module encodes the word using the word-level vector lookup table to create a corresponding word-level vector in the same manner described above with respect to step 414 of FIG. 4. In step 716, for each of the X words, the node-level module concatenates the corresponding word-level vector and character-level word vector to create a concatenated word representation for the word, in the same manner described above with respect to step 416 of FIG. 4.

Figure 8:
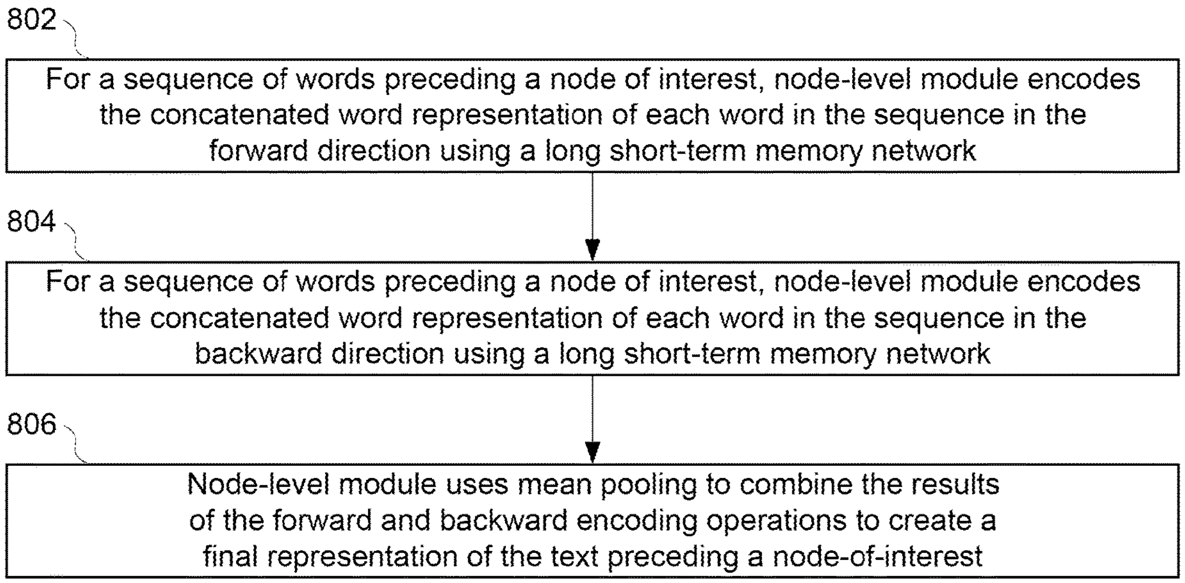
FIG. 8 is a flow diagram of an exemplary method in accordance with aspects of the disclosure.

Likewise, in steps 802 and 804 of FIG. 8, for the sequence of X words, the node-level module encodes the corresponding concatenated word representations (created in step 716 of FIG. 7) in both the forward and backward directions using an LSTM network, in the same manner described above with respect to steps 502 and 504 of FIG. 5, respectively. Here as well, steps 802 and 804 may use the same LSTM network used in connection with steps 502 and 504, or may use a separate LSTM network. Finally, in step 806, the results of the forward and backward LSTM encoding operations are subjected to mean pooling to arrive at the final representation of the preceding text of the node-of-interest, $n^{prev\_text}$, in the same manner described above with respect to generating $n^{node\_text}$ in step 506 of FIG. 5.

Encoding the preceding text of each node as described above can further aid in distinguishing between nodes of similar content. For example, in a website pertaining to automobiles, the node-level module may be programmed to identify gas mileage values on each page. A given page may thus include a first node with the text "25," and a second node with the text "32." The text of these two nodes may not, in isolation, contain enough information to determine if either represents a gas mileage value. However, in many cases, the text preceding those nodes will contain descriptive words such as "gas mileage," "fuel economy," "miles per gallon," "highway mileage," or some other text that strengthens or weakens that inference.

Figure 9:
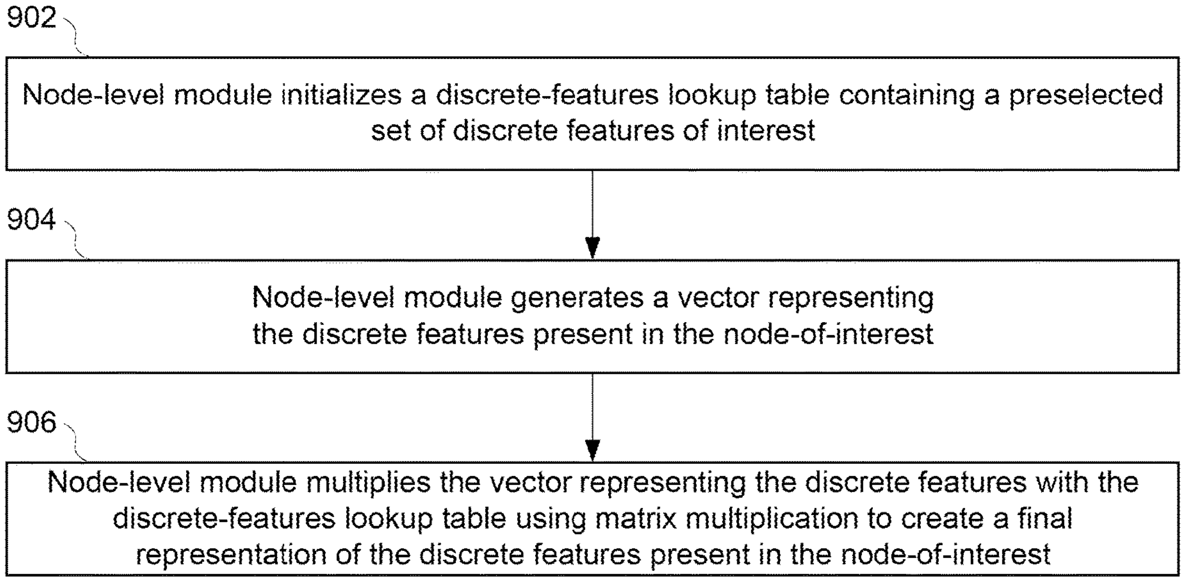
FIG. 9 is a flow diagram of an exemplary method in accordance with aspects of the disclosure.

As noted above, the node-level module also checks the text of each node against a set of preselected discrete features as shown in flow 900 of FIG. 9. This results in a third vector $n^{dis\_feat}$. Here as well, the steps of FIGS. 4-8 need not take place before those of FIG. 9. Rather, the node-level module may check for discrete features before, after, or simultaneously with its processing of the node text and/or the preceding text.

Thus, as shown in step 902 of FIG. 9, the node-level module initializes a discrete-features lookup table $E_d$ containing a preselected set of discrete features of interest. These discrete features may be anything in the raw HTML that is determined to be helpful in identifying fields-of-interest. For example, in many cases the leaf tag type (e.g., <hl>, <div>, <li>, <span>) of a node will help classify information on a page. In that regard, <hl> nodes are often more likely to include key information, such as the model name of a vehicle being displayed on the page. Similarly, known algorithms such as the string-type checkers in the NLTK toolkit may be used to determine if the text of a given node includes selected types of information, such as dates, zip codes, or URL links that are likely to be helpful. These and any other discrete features believed to be of interest may be included in the discrete-features lookup table $E_d$. The discrete-features lookup table $E_d$ is thus defined according to Equation 8 below, in which D is the set of all identified discrete features, and $dim_d$ is a hyperparameter representing the dimension of discrete-feature vectors. The dimension of discrete-feature vectors may be any suitable number, such as 30 (or more or less).

$$E_d \in \mathbb{R}^{|D| \times dim_d} \tag{8}$$

In step 904 of FIG. 9, the node-level module then generates a vector d in which each of the preselected discrete features present for a given node are represented as non-negative integers. For example, if the preselected discrete features for a given set of websites are {gas mileage, date, zip code}, and the node-of-interest has two gas mileage values, one date, and no zip codes, then vector d for that node would have a value of {2, 1, 0}. Thus, vector d is defined according to Equation 9 below, in which $\mathbb{Z}_{\geq 0}$ is a symbol representing all non-negative integers.

$$d \in \mathbb{Z}_{\geq 0}^{|D|} \tag{9}$$

In step 906 of FIG. 9, for each node-of-interest, the node-level module multiplies the vector d representing the discrete features with the discrete-features lookup table $E_d$ using matrix multiplication according to Equation 10 below. This results in a single vector $n^{dis\_feat}$, which is a final representation of the discrete features present in the node-of-interest.

$$n^{dis\_feat} = dE_d \tag{10}$$

Once the three encoding processes have been performed, the node-level module uses the resulting $n^{node\_text}$, $n^{prev\_text}$, and $n^{dis\_feat}$ vectors for each node to generate a prediction of whether the node corresponds to one of a set of predefined fields-of-interest. For example, for an automobile website, fields-of-interest may include Model Name, Vehicle Type, Engine, and Gas Mileage, and the node-level module will use the final vectors generated for each node to predict whether that node corresponds to any of those fields-of-interest. If so, the node will be labeled according to the field-of-interest to which it corresponds. If not, the node will be labeled with some null identifier such as "none" or "null." This process is set forth in further detail below with respect to flow 1000 of FIG. 10.

Figure 10:
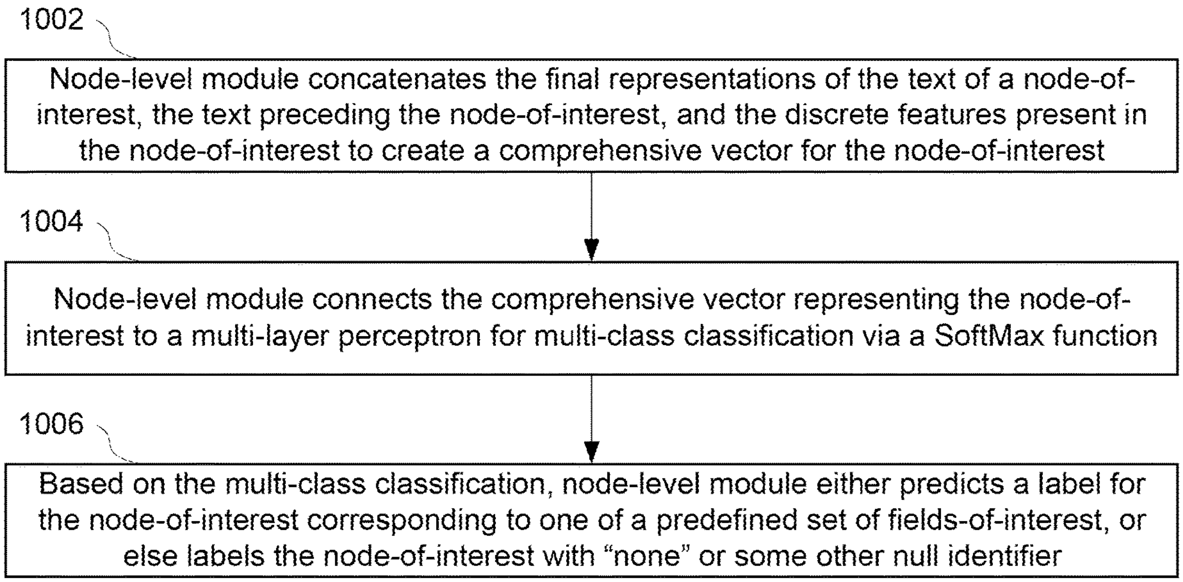
FIG. 10 is a flow diagram of an exemplary method in accordance with aspects of the disclosure.

In that regard, in step 1002 of FIG. 10, the node-level module concatenates the final representations of the text of a node-of-interest ($n^{node\_text}$), the text preceding the node-of-interest ($n^{prev\_text}$), and the discrete features present in the node-of-interest ($n^{dis\_feat}$) to create a single vector n, which is a comprehensive representation of each node. Vector n is thus described according to Equation 11 below.

$$n = \left[n^{node\_text} \odot n^{prev\_text} \odot n^{dis\_feat}\right] \tag{11}$$

In step 1004 of FIG. 10, the node-level module connects vector n to a multi-layer perceptron (MLP) neural network for multi-class classification via a SoftMax function. As shown in step 1006, based on the multi-class classification, the node-level module will predict a label l for each node-of-interest. As label l can be any one of a number of K predefined fields, or a null identifier (e.g., "none," "null," etc.), there are K+1 possible values for 1. Thus, the SoftMax normalization can be described according to Equations 12 and 13 below, where label l will be one of the set $\{f_1, \ldots, f_K, \text{none}\}$. This MLP network may be implemented with any suitable parameters. For example, the MLP network may be a one-layer dense neural network containing K+1 nodes, such that the output h is a vector of length K+1.

$$h = MLP(n), \text{ where } h \in \mathbb{R}^{K+1} \tag{12}$$

$$l = \underset{i}{\operatorname{argmax}} \frac{e^{h_i}}{\sum_{j=1}^{K+1} e^{h_j}}, \text{ where } i \in \{f_1, \ldots, f_K, \text{none}\} \tag{13}$$

As explained above, the node-level module is capable of predicting a label 1 for each node-of-interest based solely on the text of the node, its preceding text, and selected discrete features of the node. However, because the node-level module's predictions are each made in isolation for a single node-of-interest, they do not take into account what predictions have been made for other nodes. In some circumstances, this may result in the node-level module assigning the same label to multiple nodes on a page, while failing to assign other labels to any node on the page. Thus, to further improve the predictions for each node-of-interest, the technology can also employ a second-stage module that processes pairs of nodes through a relational neural network, as shown in flow 1100 of FIG. 11.

Figure 11:
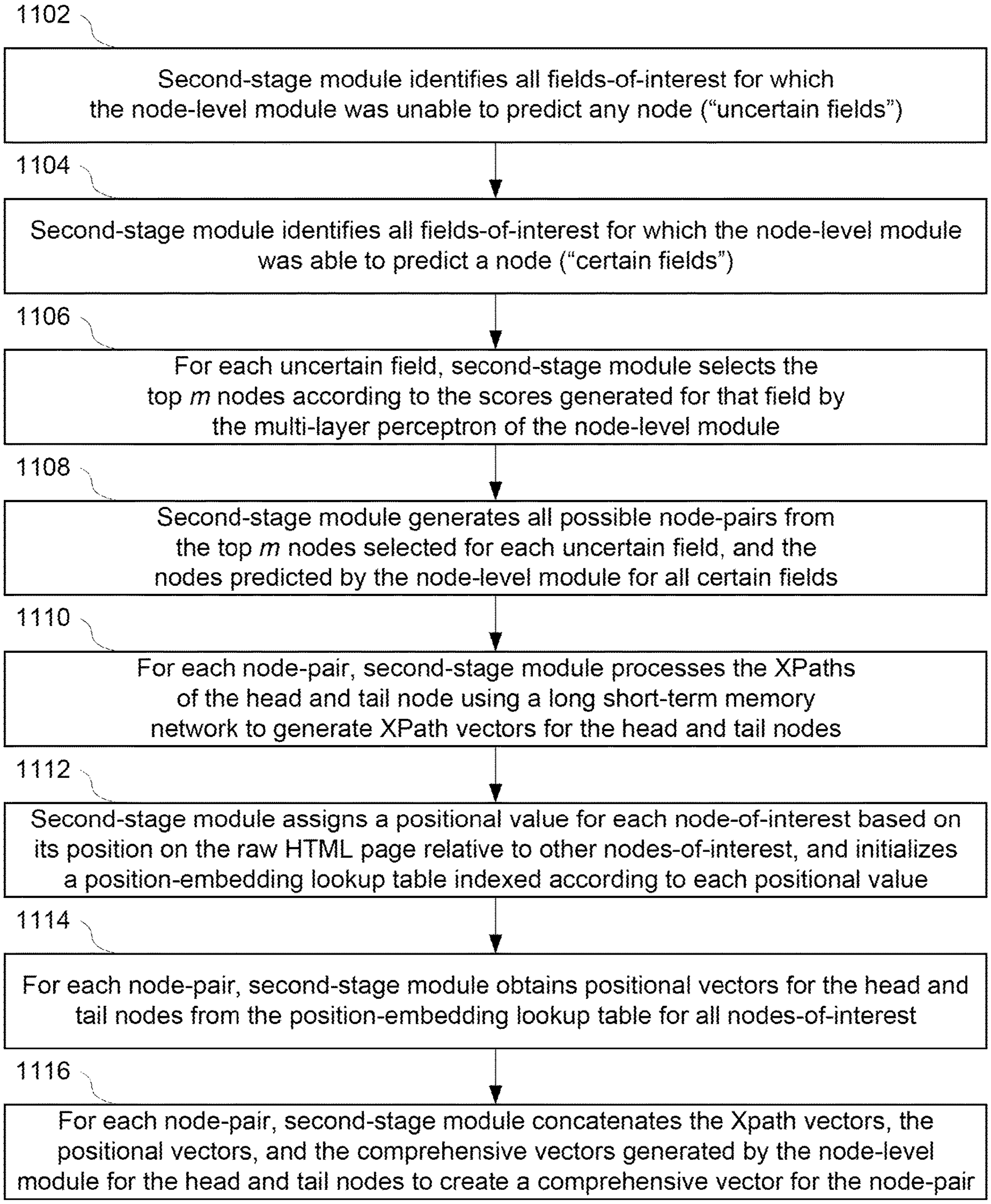
FIG. 11 is a flow diagram of an exemplary method in accordance with aspects of the disclosure.

In that regard, the second-stage module may process every possible node-pair on a given webpage, or some subset thereof, in which case the processing would begin with step 1110 of FIG. 11. However, this may not be feasible in all circumstances. For example, if the node-level module identifies and encodes 300 nodes on a page, there would be 89,700 node-pairs for the second-stage module to process (i.e., 300×299, as the order of the head and tail nodes matters in this context), which may be too computationally expensive. Thus, in some aspects of the technology, the second-stage module may instead divide the fields-of-interest into two groups as shown in steps 1102 and 1104 of FIG. 11. Thus, in step 1102, the second-stage module identifies all fields for which the node-level module predicted at least one node, which will be referred to going forward as "certain fields." Likewise, in step 1104, the second-stage module identifies all fields for which the node-level module was unable to predict any node, which will be referred to going forward as "uncertain fields." Then, in step 1108, the second-stage module will create all possible node-pairs from the following sets of nodes. For each certain field, the second-stage module will use the node predicted for that field. For each uncertain field, as shown in step 1106, the second-stage module will use the top m nodes (e.g., m may between 5 and 20, or more or less) according to the $h_i$ score that was generated for that field by the node-level module according to Equations 12 and 13 above. This will result in three types of node-pairs. The nodes for each certain field will be paired with the nodes for all other certain fields. Thus, if there are T certain fields, there will be T(T−1) node-pairs that consist entirely of nodes for of two certain fields. In addition, the nodes for each certain field will be paired with the top m nodes identified for each uncertain field. Thus, if there are K total fields, this results in an additional 2T(m(K−T)) such node-pairs, as the order of the head and tail nodes matters in this context. Finally, the top m nodes identified for each uncertain field will be paired with the top m nodes identified for all other uncertain fields. This results in an additional $m^2(K-T)(K-T-1)$ such node-pairs. Accordingly, the total number of node-pairs generated as a result of step 1108 of FIG. 11 can be expressed according to Equation 14 below.

$$\text{node\_pairs} = \left(T(T-1) + 2T(m(K-T)) + m^2(K-T)(K-T-1)\right) \tag{14}$$

The second-stage module then processes each node-pair ($n_{head}$, $n_{tail}$) through a relational neural network in order to predict a pair-label ($l_{head}$, $l_{tail}$). To do this, the second-stage module processes the node-pairs in two ways based on the assumption that two nodes that are closer to each other are more likely to be similar to each other.

In one case, as shown in step 1110, the second-stage module processes each node-pair according to the XPaths of the head and tail nodes. In that regard, each XPath can be seen as a sequence of HTML tags such as "<html>," "<body>," "<div>," "<ul>," and "<li>." The second-stage module maintains an embedding matrix for all the possible HTML tags, where each tag is represented as a vector. An LSTM network (which may be a different network than the LSTM networks used by the node-level module) then uses that matrix to encode each node-pair based on their XPaths, as shown in Equation 15 below. This results in vectors $$n_{head}^{xpath} \text{ and } n_{tail}^{xpath}$$

for the head and tail nodes, respectively. The LSTM network may employ any suitable number of units, such as 100 (or more or less).

$$n^{xpath} = LSTM([\text{tag}_1, \text{tag}_2, \ldots ]) \tag{15}$$

In another case, as shown in steps 1112 and 1114, the second-stage module processes each node-pair according to its position on the raw HTML page relative to other nodes. In that regard, as shown in step 1112, every node-of-interest on the page will be assigned a positional value based on its order relative to the total number of nodes-of-interest. For example, for a page with 500 nodes-of-interest, the fifth node may be assigned a value of 5. As another example, the fifth node may be assigned a scaled value such as 5/500=0.01. As further shown in step 1112, the second-stage module will then initialize a position-embedding look-up table $E_{pos}$ indexed according to each positional value, in which each positional value is associated with a position-embedding vector. The position-embedding vectors of $E_{pos}$ are randomly initialized, and then updated during model training through back-propagation. Then, as shown in step 1114, the second-stage module uses the position-embedding look-up table $E_{pos}$ to obtain vectors $$n_{head}^{pos} \text{ and } n_{tail}^{pos}$$

for the positions of the head and tail nodes of each node-pair, respectively.

In addition to the above, the second-stage module also makes use of the comprehensive node vectors n that were generated by the node-level module for each head and tail node, i.e., the n vectors generated pursuant to Equation 11 above. Thus, in step 1116, the second-stage module concatenates the comprehensive node vectors, $n_{head}$ and $n_{tail}$, with the vectors $$n_{head}^{xpath} \text{ and } n_{tail}^{xpath}$$

(from Equation 15) and $$n_{head}^{pos} \text{ and } n_{tail}^{pos}$$

to arrive at a single comprehensive node-pair vector r, as shown in Equation 16 below.

$$r = \left[n_{head} \odot n_{tail} \odot n_{head}^{xpath} \odot n_{tail}^{xpath} \odot n_{head}^{pos} \odot n_{tail}^{pos}\right] \tag{16}$$

Figure 12:
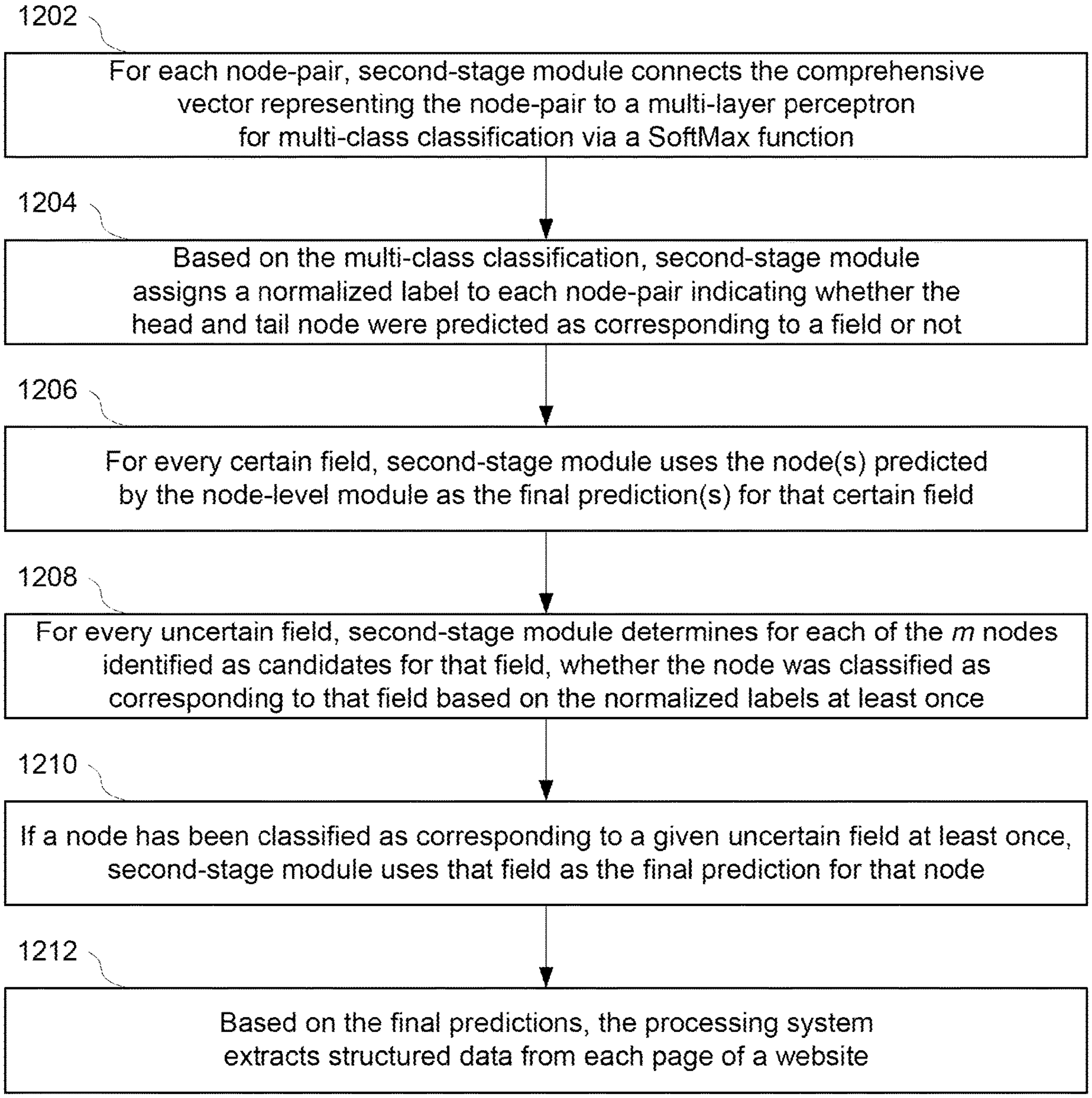
FIG. 12 is a flow diagram of an exemplary method in accordance with aspects of the disclosure.

As shown in step 1202 of flow 1200 of FIG. 12, for each node-pair, the second-stage module then connects the comprehensive node-pair vector r with an MLP network (which may be a different network than the MLP network used by the node-level module) for multi-class classification via a SoftMax function. This MLP network may be implemented with any suitable parameters. For example, the MLP network may be a one-layer dense neural network containing four nodes, such that the output is a 1×4 vector. The vector output by the MLP is then normalized by the SoftMax function. Based on this classification, in step 1204, the second-stage module assigns a normalized label to each node-pair. The normalized labels are selected from the set of {"none-none", "none-value", "value-none", "value-value" }.

As shown in step 1206, for every certain field, the second-stage module utilizes the nodes predicted by the first stage module as the final prediction(s) for that field. As shown in step 1208, for every uncertain field, the second-stage module determines whether any of the m nodes that were originally identified as candidates for that field have been classified as "value" in any of the node-pairs in which they have been included. If so, in step 1210, the second-stage module uses that field as the final prediction for that node. For example, for a field F, and a candidate node y (which was one of the m nodes that were originally identified as candidates for field F), there may be four node-pairs involving node y. If node y received a label of "none" in three of those pairs, and a label of "value" in one of those pairs, then the final prediction for node y would be that it corresponds to field F. Finally, as shown in step 1212, based on these final predictions, the processing system extracts structured data from each identified node of each page of each seed website. Importantly, the technology allows the processing system to extract this web data in a structured form that preserves the association between the data and its predicted field-of-interest. For example, the extracted data may comprise data extracted about automobiles with four fields-of-interest, in which the data is associated with the label for each of those fields, e.g., {Model Name|328xi, Vehicle Type|Coupe, Engine|3.0 L Inline 6 Cylinder, Gas Mileage|17/25 mpg}. This results in functional data. That is, the data is in a structured form which is machine-actionable, allowing it to be used in controlling operation of the processing system and/or other systems for a variety of purposes. For example, the structured data can be used to improve search results in a search engine, or to create databases from disparate data sources. In another example, the structured data from websites or HTML-based emails or messages may be used by an automated assistant to provide answers to questions, or to automatically add events to a user's calendar. These examples are, of course, not intended to be limiting.

Figure 13:
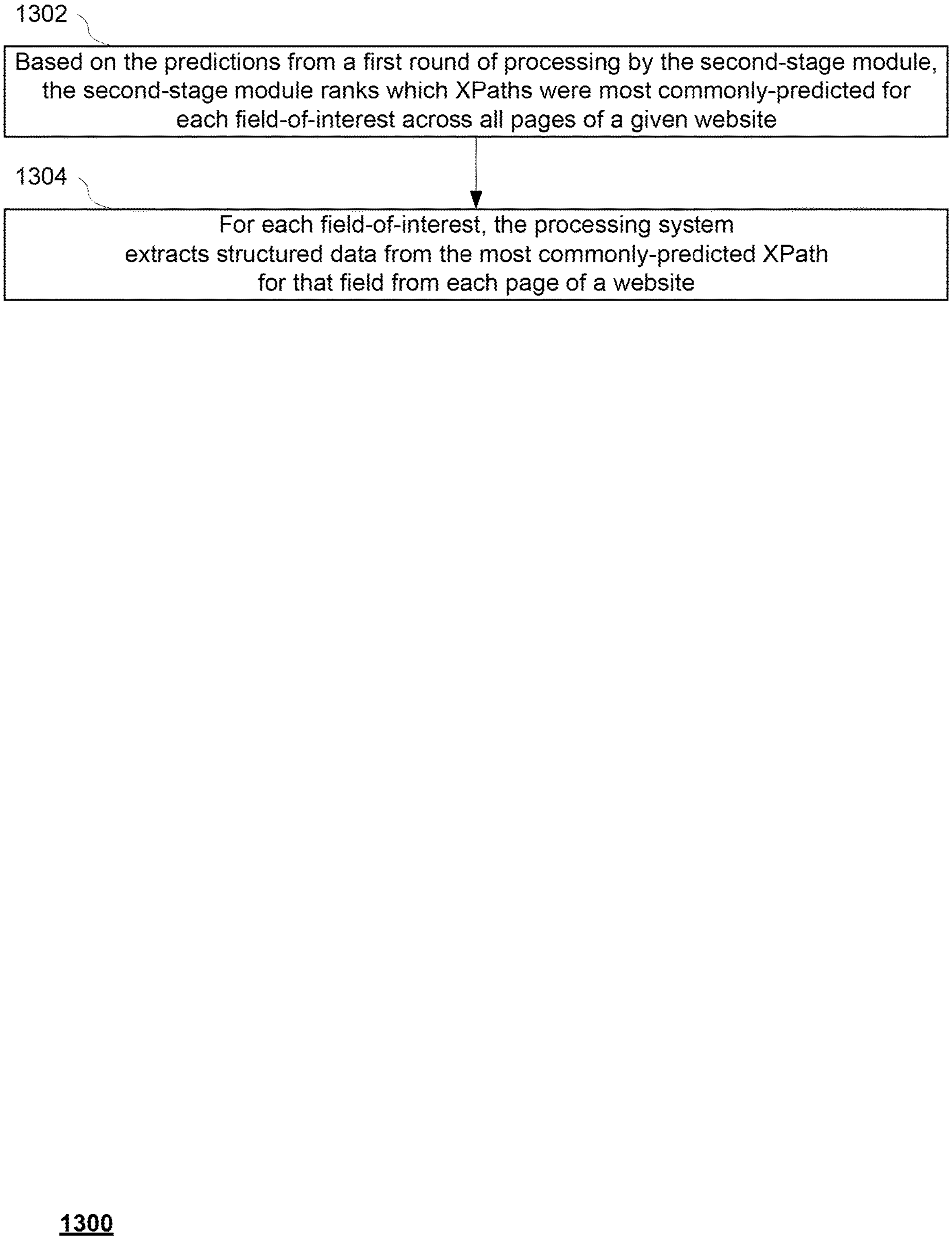
FIG. 13 is a flow diagram of an exemplary method in accordance with aspects of the disclosure.

In addition to the above, as shown in flow 1300 of FIG. 13, the second-stage module may also utilize an additional heuristic method for improving the model's predictions. In that regard, for some websites, the nodes associated with a particular field may have a relatively small number of XPaths across individual pages. As such, as shown in step 1302 of FIG. 13, after the second-stage module has generated its first set of predictions, it can rank, for each field-of-interest $f_k$, which XPath was most often predicted for that field across all pages. Then, as shown in step 1304, for each field-of-interest $f_k$, the second-stage module can extract data from the most commonly-predicted XPath for that field. This extraction can be done in addition to extracting data from whatever node(s) were indicated by the first set of predictions for that field, as described above with respect to FIG. 12.

Finally, once the processing system has generated final predictions for all pages of all seed websites as set forth above, the processing system can perform the same processing steps to generate final predictions for an additional set of non-seed websites. These additional final predictions can then be used to extract further structured data from those non-seed websites in the same manner described above. In that regard, as a result of having first exposed the neural networks to seed websites that have data regarding the fields-of-interest that are more annotated, organized, current, and/or complete, the models built by the neural networks will more accurately be able to identify fields-of-interest in non-seed websites which may have data that is not as well annotated, organized, current, and/or complete. The present technology thus enables generation of models with little or no human input that are then transferrable, such that structured, functional data can efficiently be extracted across multiple domains.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of exemplary systems and methods should be taken by way of illustration rather than by way of limitation of the subject matter defined by the claims. In addition, the provision of the examples described herein, as well as clauses phrased as "such as," "including," "comprising," and the like, should not be interpreted as limiting the subject matter of the claims to the specific examples; rather, the examples are intended to illustrate only some of the many possible embodiments. Further, the same reference numbers in different drawings can identify the same or similar elements.

The invention claimed is:

1. A computer-implemented method of generating a node label, the method comprising:

generating, by one or more processors of a processing system, a plurality of word-level vectors for a website;

generating, by the one or more processors, a plurality of character-level word vectors using a character-embedding lookup table, the plurality of word-level vectors and the plurality of character-level word vectors corresponding to each word of a first sequence of words of a first text node of a Hypertext Markup Language (HTML) document object model (DOM) tree representing the website and each word of a second sequence of words of a second text node of the DOM tree, in which a length of each word-level vector of a given word is less than or equal to a length of a character-level word vector of the given word, wherein the first text node includes a first XML Path ("XPath") and first content, and the second text node includes a second XPath and second content;

generating, by the one or more processors, a first comprehensive vector of the first text node based on the plurality of word-level vectors, the plurality of character-level word vectors, and one or more predefined features in the first content of the first text node;

generating, by the one or more processors, a second comprehensive vector of the second text node based on the plurality of word-level vectors, the plurality of character-level word vectors, and one or more predefined features in the second content of the second text node;

generating, by the one or more processors, a first node label for the first text node based on the first comprehensive vector for the first text node;

generating, by the one or more processors, a second node label for the second text node based on the second comprehensive vector for the second text node;

extracting, by the one or more processors from the first text node, first machine-actionable structured data associating the first content with the first node label for the first text node; and extracting, by the one or more processors from the second text node, second machine-actionable structured data associating the second content with the second node label for the second text node.

2. The method of claim 1, wherein generating the plurality of character-level word vectors corresponding to each word of the first sequence and the second sequence comprises:

for each given word in the first sequence, encoding a character vector corresponding to each of one or more characters of the given word using a neural network; and for each given word in the second sequence, encoding a character vector corresponding to each of one or more characters of the given word using a neural network.

3. The method of claim 1, further comprising:

generating, by the one or more processors, a sequence-level vector based on one or more word-level vectors of the plurality of word-level vectors and one or more character-level word vectors of the plurality of character-level word vectors;

wherein the first comprehensive vector of the first text node is further based on the sequence-level vector.

4. The method of claim 3, wherein the one or more word-level vectors of the plurality of word-level vectors correspond to the first sequence and the one or more character-level word vectors of the plurality of character-level word vectors correspond to the first sequence.

5. The method of claim 4, wherein generating the sequence-level vector includes:

encoding the one or more character-level word vectors of the plurality of character-level word vectors and the one or more word-level vectors of the plurality of word-level vectors of each word of the first sequence using a bidirectional long short-term memory neural network.

6. The method of claim 3, wherein the one or more word-level vectors of the plurality of word-level vectors correspond to the second sequence and the one or more character-level word vectors of the plurality of character-level word vectors correspond to the second sequence.

7. The method of claim 6, wherein generating the sequence-level vector includes:

encoding the one or more character-level word vectors of the plurality of character-level word vectors and the one or more word-level vectors of the plurality of word-level vectors of each word of the second sequence using a bidirectional long short-term memory neural network.

8. The method of claim 1, wherein generating the first node label for the first text node based on the first comprehensive vector for the first text node includes:

encoding the first comprehensive vector for the first text node using a multi-layer perceptron neural network to obtain a classification for the first text node.

9. The method of claim 1, wherein the first node label for the first text node corresponds to one of a plurality of fields-of-interest.

10. The method of claim 1, further comprising:

generating, by the one or more processors, a prediction for each of the first text node and the second text node regarding whether the respective first text node and second text node relate to one of a plurality of fields-of-interest.

11. The method of claim 10, further comprising:

generating, by the one or more processors, a positional vector of the first text node based on at least a relative position of the first text node; and generating, by the one or more processors, a positional vector of the second text node based on at least a relative position of the second text node.

12. The method of claim 11, further comprising:

generating, by the one or more processors, a pair-level vector based on at least the first comprehensive vector of the first text node, the second comprehensive vector of the second text node, the positional vector of the first text node, and the positional vector of the second text node.

13. The method of claim 12, further comprising:

generating, by the one or more processors, a pair label for the first text node and the second text node based on the pair-level vector.

14. The method of claim 13, wherein the first node label for the first text node is based on the pair label.

15. The method of claim 1, wherein the first text node corresponds to a first subset of the website, and wherein the second text node corresponds to a second subset of the website.

16. The method of claim 15, wherein the first subset comprises a first word and a second word semantically different than the first word, and wherein the second subset comprises a third word and a fourth word semantically different than the third word.

17. A processing system, comprising:

a memory; and one or more processors coupled to the memory and configured to:

generate a plurality of word-level vectors for an electronic document;

generate a plurality of character-level word vectors using a character-embedding lookup table, the plurality of word-level vectors and the plurality of character-level word vectors corresponding to each word of a first sequence of words of a first text node of a document object model (DOM) tree representing the electronic document and each word of a second sequence of words of a second text node of the DOM tree, in which a length of each word-level vector of a given word is less than or equal to a length of a character-level word vector of the given word, wherein the first text node includes a first XML Path ("XPath") and first content, and the second text node includes a second XPath and second content;

generate a first comprehensive vector of the first text node based on the plurality of word-level vectors, the plurality of character-level word vectors, and one or more predefined features in the first content;

generate a second comprehensive vector of the second text node based on the plurality of word-level vectors, the plurality of character-level word vectors, and one or more predefined features in the second content;

generate a first node label for the first text node based on the first comprehensive vector for the first text node;

generate a second node label for the second text node based on the second comprehensive vector for the second text node;

extract, from the first text node, first machine-actionable structured data associating the first content with the first node label for the first text node; and extract, from the second text node, second machine-actionable structured data associating the second content with the second node label for the second text node.

18. The system of claim 17, wherein the first node label for the first text node corresponds to one of a plurality of fields-of-interest.

19. The system of claim 17, wherein the one or more processors are further configured to:

generate a prediction for each of the first text node and the second text node regarding whether that node relates to one of a plurality of fields-of-interest;

generate a positional vector of the first text node based on at least a relative position of the first text node;

generate a positional vector of the second text node based on at least a relative position of the second text node;

generate a pair-level vector based on at least the first comprehensive vector of the first text node, the second comprehensive vector of the second text node, the positional vector of the first text node, and the positional vector of the second text node; and generate a pair label for the first and second text nodes based on the pair-level vector;

wherein the one or more word-level vectors of the plurality of word-level vectors correspond to the second sequence and the one or more character-level word vectors of the plurality of character-level word vectors correspond to the second sequence.

20. The system of claim 19, wherein the first node label for the first text node is based on the pair label.

* * * * *